(12) United States Patent
Yamaji

(10) Patent No.: US 10,563,879 B2
(45) Date of Patent: Feb. 18, 2020

(54) AIR CONDITIONER, SENSOR UNIT, AND CONTROL SYSTEM

(71) Applicant: FUJITSU LIMITED, Kawasaki-shi, Kanagawa (JP)

(72) Inventor: Takayuki Yamaji, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 182 days.

(21) Appl. No.: 15/812,458

(22) Filed: Nov. 14, 2017

(65) Prior Publication Data

US 2018/0080673 A1 Mar. 22, 2018

Related U.S. Application Data

(63) Continuation of application No. PCT/JP2015/063876, filed on May 14, 2015.

(51) Int. Cl.
| | |
|---|---|
| *F24F 11/30* | (2018.01) |
| *F24F 11/89* | (2018.01) |
| *F24F 11/74* | (2018.01) |
| *G08C 17/02* | (2006.01) |
| *F24F 11/79* | (2018.01) |

(Continued)

(52) U.S. Cl.
CPC ............. *F24F 11/30* (2018.01); *F24F 11/62* (2018.01); *F24F 11/74* (2018.01); *F24F 11/79* (2018.01); *F24F 11/89* (2018.01); *G08C 17/02* (2013.01); *F24F 11/52* (2018.01); *F24F 11/56* (2018.01); *F24F 11/65* (2018.01); *F24F 11/66* (2018.01); *F24F 2120/10* (2018.01); *F24F 2120/12* (2018.01); *F24F 2120/14* (2018.01); *G05B 2219/2614* (2013.01); *G08C 2201/00* (2013.01)

(58) Field of Classification Search
CPC .. F24F 11/30; F24F 11/74; F24F 11/79; F24F 11/62; F24F 11/89; F24F 2120/14; F24F 11/56; F24F 11/66; F24F 11/52; F24F 11/65; F24F 2120/10; F24F 2120/12; G08C 17/02; G08C 2201/00; G05B 2219/2614
See application file for complete search history.

(56) References Cited

U.S. PATENT DOCUMENTS

| | | | | |
|---|---|---|---|---|
| 5,528,246 A | * | 6/1996 | Henderson | ............... G01S 7/415 342/115 |
| 5,983,629 A | * | 11/1999 | Sawada | .................. F01N 11/007 60/276 |

(Continued)

FOREIGN PATENT DOCUMENTS

| | | |
|---|---|---|
| JP | 2004-291868 | 10/2004 |
| JP | 2011-15887 | 1/2011 |

(Continued)

OTHER PUBLICATIONS

International Search Report dated Aug. 4, 2015 in corresponding International Patent Application No. PCT/JP2015/063876.

*Primary Examiner* — Thomas C Lee
*Assistant Examiner* — Michael Tang
(74) *Attorney, Agent, or Firm* — Staas & Halsey LLP

(57) ABSTRACT

An air conditioner includes a first Doppler sensor that transmits a first electric wave of first power, a second Doppler sensor that transmits a second electric wave of second power less than the first power, and a controller that controls an operation of the air conditioner on the basis of a detection signal of the first Doppler sensor and a detection signal of the second Doppler sensor.

14 Claims, 30 Drawing Sheets

(51) Int. Cl.
*F24F 11/62* (2018.01)
*F24F 11/66* (2018.01)
*F24F 120/10* (2018.01)
*F24F 120/12* (2018.01)
*F24F 120/14* (2018.01)
*F24F 11/65* (2018.01)
*F24F 11/56* (2018.01)
*F24F 11/52* (2018.01)

(56) References Cited

U.S. PATENT DOCUMENTS

| | | | | |
|---|---|---|---|---|
| 6,206,340 | B1 * | 3/2001 | Paese | E03C 1/057 |
| | | | | 251/129.04 |
| 7,372,394 | B1 * | 5/2008 | Woodell | G01S 7/292 |
| | | | | 342/26 R |
| 9,482,573 | B2 * | 11/2016 | Peczalski | G01H 9/00 |
| 2004/0201481 | A1 | 10/2004 | Yoshinori et al. | |
| 2008/0146866 | A1 | 6/2008 | Arai et al. | |
| 2009/0002222 | A1 * | 1/2009 | Colburn | G01C 9/00 |
| | | | | 342/145 |
| 2009/0268326 | A1 * | 10/2009 | Shelor | G11B 5/455 |
| | | | | 360/31 |
| 2013/0197377 | A1 | 8/2013 | Kishi et al. | |
| 2014/0058254 | A1 | 2/2014 | Yamaji | |
| 2014/0218263 | A1 * | 8/2014 | Burdenski | H01Q 1/32 |
| | | | | 343/872 |
| 2015/0003625 | A1 * | 1/2015 | Uhle | H04R 3/002 |
| | | | | 381/71.6 |

FOREIGN PATENT DOCUMENTS

| | | |
|---|---|---|
| JP | 2011-122732 | 6/2011 |
| JP | 2011-128120 | 6/2011 |
| JP | 2011122732 A * | 6/2011 |
| JP | 2013-24466 | 2/2013 |
| JP | 2013-153782 | 8/2013 |
| JP | 2014-39666 | 3/2014 |
| JP | 2014-83148 | 5/2014 |
| JP | 2015-21658 | 2/2015 |
| WO | 2006/038441 A1 | 4/2006 |

* cited by examiner

FIG. 16

| BLAST VOLUME[m^3/min] | CORRECTION COEFFICIENT θ |
|---|---|
| 0 | 0 |
| 5.23 | 0.002 |
| 6.87 | 0.005 |
| 9.15 | 0.013 |

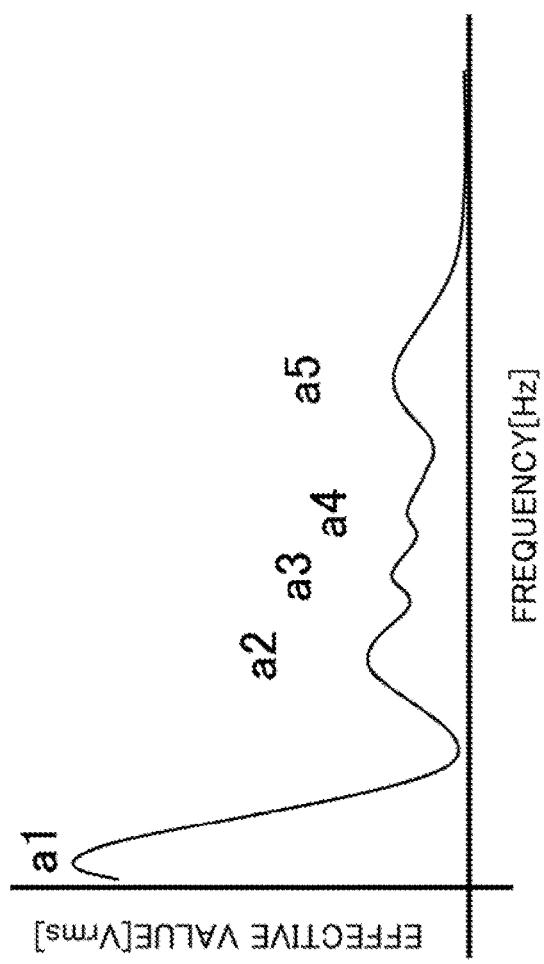
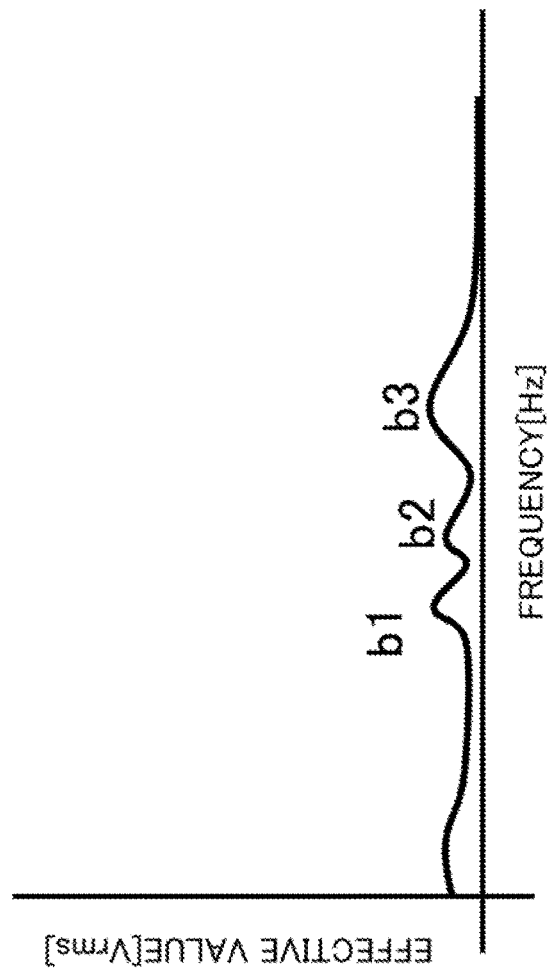
FIG. 23A
FIG. 23B

FIG. 26

|  | REM SLEEP | NON-REM SLEEP |
|---|---|---|
| HEART RATE | INCREASE IRREGULAR | DECREASE |
| RESPIRATION RATE | INCREASE | DECREASE STABLE |
| BODY MOTION AMOUNT | NONE | NONE |

FIG. 28

| | REM SLEEP | NON-REM SLEEP |
|---|---|---|
| HEART RATE | STANDARD DEVIATION OF GREATER THAN OR EQUAL TO 2 HEART RATE OF GREATER THAN OR EQUAL TO 45 | STANDARD DEVIATION OF LESS THAN 2 HEART RATE OF LESS THAN 45 |
| RESPIRATION RATE | STANDARD DEVIATION OF GREATER THAN OR EQUAL TO 1.5 | STANDARD DEVIATION OF LESS THAN 1.5 |
| BODY MOTION AMOUNT | NONE | NONE |

FIG. 29

HEART BEAT DATA

| DATA NUMBER | HEART RATE[bpm] | HEART RATE[bpm] |
|---|---|---|
| 1 | 38 | 35 |
| 2 | 37 | 37 |
| 3 | 39 | 36 |
| 4 | 36 | 44 |
| 5 | 39 | 49 |
| 6 | 37 | 46 |
| 7 | 35 | 48 |
| 8 | 40 | 50 |
| 9 | 38 | 52 |
| 10 | 39 | 44 |
| 11 | 37 | 49 |
| 12 | 35 | 51 |
| 13 | 35 | 52 |
| 14 | 38 | 51 |
| 15 | 36 | 53 |
| 16 | 37 | 48 |
| 17 | 39 | 51 |
| 18 | 37 | 49 |
| STANDARD DEVIATION | 1.62 | 2.34 |
| AVERAGE | 37.3 | 46.9 |

AIR CONDITIONER, SENSOR UNIT, AND CONTROL SYSTEM

CROSS-REFERENCE TO RELATED APPLICATION

This application is a continuation application of International Application PCT/JP2015/063876, filed on May 14, 2015 and designated the U.S., the entire contents of which are incorporated herein by reference.

FIELD

The embodiment discussed herein is related to an air conditioner, a sensor unit, and a control system and a control method of an air conditioner.

BACKGROUND

A technology of measuring biological information such as a heart beat, a respiration, or a motion of a living body has been studied and considered. In addition, a technology of linking the measured biological information, for example, to the control of an air conditioning has been also considered.

CITATION LIST

Patent Literature

Patent Literature 1: Japanese Laid-open Patent Publication No. 2014-83148
Patent Literature 2: Japanese Laid-open Patent Publication No. 2011-015887

SUMMARY

According to an aspect of the embodiment, an air conditioner may include a first Doppler sensor, a second Doppler sensor, and a controller. The first Doppler sensor may transmit a first electric wave of first power. The second Doppler sensor may transmit a second electric wave of second power less than the first power. The controller may control the operation of the air conditioner on the basis of a detection signal of the first Doppler sensor and a detection signal of the second Doppler sensor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 16 is a diagram illustrating an example of a relationship between a blast volume of the air conditioner and a correction coefficient of the wavelength in the extension according to an embodiment.

FIG. 23A is a diagram illustrating an example of a frequency analysis result of a detection signal of a first Doppler sensor according to an embodiment, and FIG. 23B is a diagram illustrating an example of a frequency analysis result of a detection signal of a second Doppler sensor according to an embodiment.

FIG. 26 is a diagram for illustrating the sleep determination based on the heart rate, the respiration rate, and the body motion amount according to the third example.

FIG. 28 is a diagram for illustrating the sleep determination based on the heart rate, the respiration rate, and the body motion amount according to the third example.

FIG. 29 is a diagram illustrating an example of heart beat data according to the third example.

DESCRIPTION OF EMBODIMENT(S)

Figure 1:
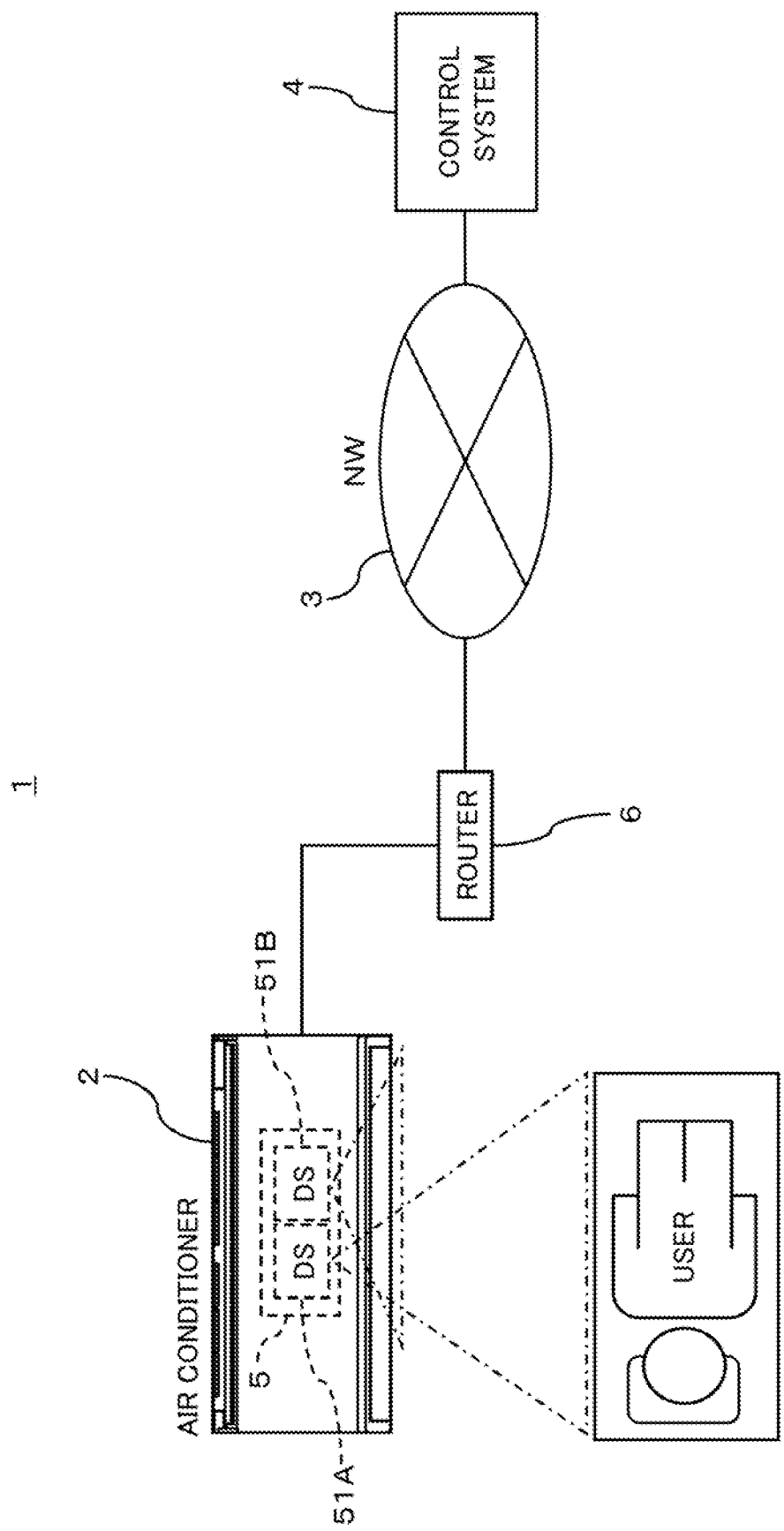
FIG. 1 is a block diagram illustrating a configuration example of an air conditioning system according to an embodiment.

The heart beat, the respiration, or the motion of the living body are capable of being detected by using a Doppler sensor. However, for example, in a case where the Doppler sensor is disposed in the air conditioner, a noise component may be included in a detection value of the Doppler sensor due to the motion or the vibration of the air conditioner according to the driving of the air conditioner. For this reason, an error may occur in the detection of the biological information.

As an aspect, one of the objects of the present invention is to enhance the accuracy in detecting biological information with a Doppler sensor included in an air conditioner.

Hereinafter, an embodiment will be described with reference to the drawings. Here, the embodiment described below is merely an example, and there is no intention to exclude the application of various modifications or technologies, which are not explicitly described below. In addition, various exemplary aspects described below may be performed by being suitably combined. Furthermore, in the drawings used in the embodiment described below, portions to which the same reference numerals are applied, represent the same or the similar portions, unless otherwise particularly noted.

FIG. 1 is a block diagram illustrating a configuration example of an air conditioning system according to an embodiment. Exemplarily, an air conditioning system 1 illustrated in FIG. 1 may include an air conditioner 2, a network (NW) 3, and a control system 4.

Exemplarily, the air conditioner 2 may be connected to the network 3 to communicate with each other through a router 6. The control system 4 may be connected to the network 3. Therefore, exemplarily, the air conditioner 2 may communicate with the control system 4 through the router 6 and the network 3.

The air conditioner 2 is capable of transmitting a signal (may be referred to as "information" or "data") to represent a driving situation of the air conditioner 2 to the control system 4 by the communication with the control system 4, and of receiving a signal to control the driving of the air conditioner 2 from the control system 4.

The connection between the air conditioner 2 and the router 6 may be wired connection or wireless connection. In other words, the air conditioner 2 may include a communication interface (IF) which supports communication of one or both of wired communication and wireless communication.

Furthermore, the air conditioner 2 may be an air conditioner for domestic use and an air conditioner for professional use. The air conditioner 2 for domestic use is an example of so-called "home electronics", and the "home electronics" which are capable of communicating with the network 3 may be referred to as "information home electronics".

Exemplarily, the network 3 may be corresponded to a wide area network (WAN), a local area network (LAN), or the internet. In addition, the network 3 may include a wireless access network. For example, the router 6 may be connected to the wireless access network by a wireless IF, and may communicate with the control system 4.

As described above, the control system 4 is capable of communicating with the air conditioner 2 through the network 3 and the router 6, and for example, is capable of controlling the operation of the air conditioner 2 (may be referred to as "driving") on the basis of information received from the air conditioner 2.

Exemplarily, the control system 4 may include one or a plurality of servers. In other words, the driving of the air conditioner 2 may be controlled by one server, or may be dispersively controlled by a plurality of servers. The server, for example, may correspond to a cloud server which is provided in a cloud data center.

A sensor 5 may be built in the air conditioner 2. Exemplarily, the sensor 5 is capable of sensing biological information of the user in a space where the air conditioner 5 targets as an air conditioning area, in a non-contact manner. Furthermore, the space where the air conditioner 2 is the air conditioning target may be conveniently referred to as an "air-conditioned space".

The "air-conditioned space" may be an interior space, or for example, may be an indoor space such as a bedroom. The user in the "air-conditioned space" is an example of the sensing target of the sensor 5. The "biological information" may be referred to as "vital information". The "sensing" may be referred to as "detecting" or "measuring".

A non-attributive example of the vital information is information to represent a heart beat, a respiration, and a body motion of the user. The "living body" may include an "internal organ" of the living body. The "heart beat" may be regarded as information to represent a motion of a "heart" which is an example of the "internal organ".

The "motion" of the living body (may be referred to as a "position change") may be conveniently and simply referred to as a "body motion". Exemplarily, the "body motion" is not limited to the motion of the living body during in action, but may include a motion of a living body surface (for example, a skin) according to the heart beat or the respiration at rest such as during sleep of the living body.

The motion of the living body surface may be regarded as occurring according to the motion of the internal organ of the living body. For example, a motion occurs on the skin according to the pulse of the heart. In addition, a motion occurs on the skin according to expansion and contraction of the lung due to the respiration.

Exemplarily, the sensor 5 is capable of applying an electric wave such as a microwave to a sensing target, and of detecting the "motion" of the living body in a non-contact manner on the basis of a change in a reflective wave which is received by being reflected on the sensing target.

For example, in a case where a distance between the sensor 5 and the sensing target is changed, a change occurs in the reflective wave according to a Doppler effect. Exemplarily, the change in the reflective wave is capable of being regarded as a change of one or both of the amplitude and the frequency of the reflective wave.

For example, it is possible to detect, determine, or assume a sleep state of whether the user is in sleep or during a waking period in a non-contact manner, on the basis of vital information sensed by the sensor 5.

Therefore, the sensor 5 may be conveniently referred to as a "non-contact vital sensor 5" or a "non-contact sleep sensor 5". The determination of the sleep state based on the vital information may be conveniently and simply referred to as "sleep determination". An example of a sleep determination method will be described below.

The sensor 5 may communicate with the network 3 through the router 6. For example, the sensor 5 may transmit information such as the sensed vital information or a sleep determination result to the control system 4 through the router 6 and the network 3.

The information which is transmitted to the control system 4 by the sensor 5 may be conveniently and collectively referred to as "sensor information". The "sensor information" may include one or both of the vital information and the sleep determination result.

The control system 4 may remotely control the driving of the air conditioner 2 such that, for example, the air-conditioned space is a comfortable environment for the user, on the basis of the sensor information.

Exemplarily, remote control (may be referred to as "air conditioning control") of the driving of the air conditioner 2 may include temperature control, air flow control, wind direction control, or the like, which helps good sleep of the user in bedtime. Such air conditioning control may be conveniently referred to as "good sleep control".

Furthermore, unlike the air conditioner 2, there is a case where the sensor 5 is not controlled by the control system 4. In other words, there is a case where the sensor 5 does not support the reception of the signal which is transmitted from the control system 4 insofar as one-way communication with respect to the control system 4 is capable of being performed.

In addition, there is a case where the driving of the air conditioner 2 is not remotely controlled by the control system 4. A controller built in the air conditioner 2 independently from the control system 4 may autonomously control the driving of the air conditioner 2.

(Configuration Example of Non-Contact Vital Sensor 5)

Figure 2:
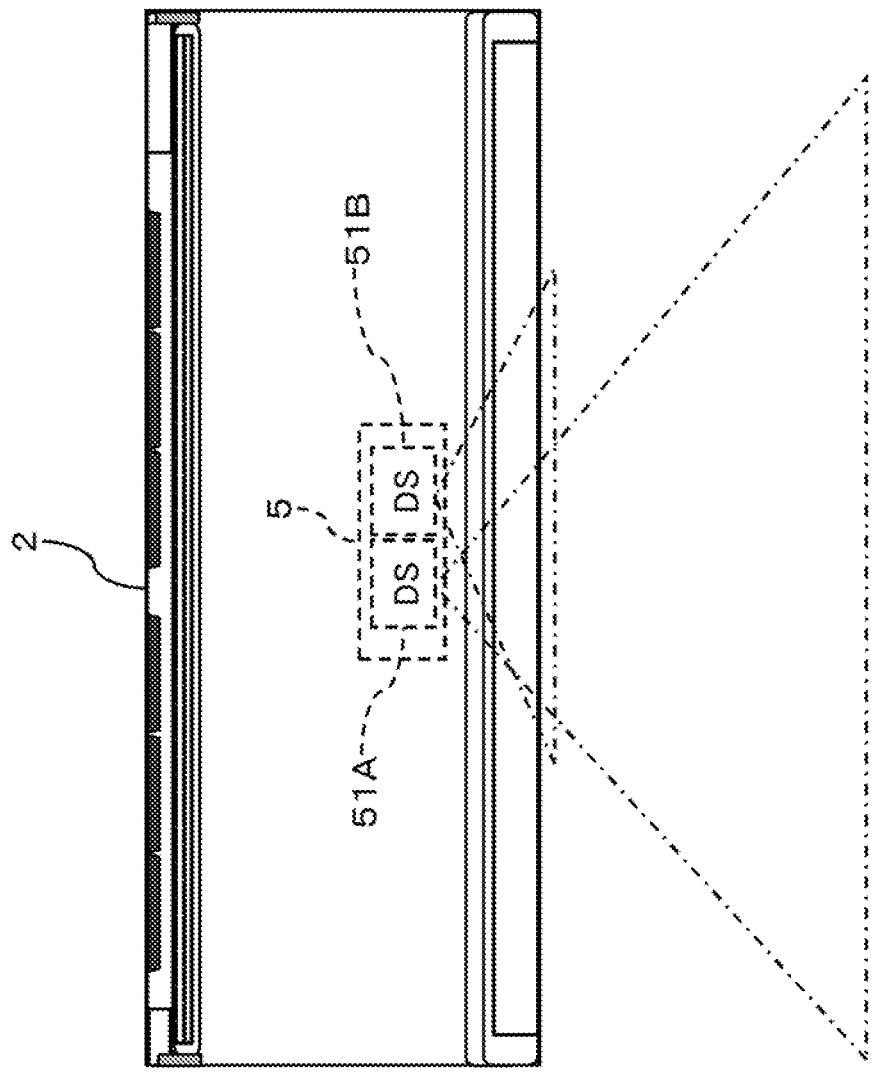
FIG. 2 is a diagram schematically illustrating an example in which a non-contact vital sensor is provided in the air conditioner exemplified in FIG. 1.

Next, a configuration example of the non-contact vital sensor 5 will be described with reference to FIG. 1 to FIG. 4. As illustrated in FIG. 1 and FIG. 2, exemplarily, the non-contact vital sensor 5 may include a first Doppler sensor (DS) 51A and a second Doppler sensor (DS) 51B.

Furthermore, in a case where the Doppler sensors 51A and 51B are not distinguished from each other, there is a case where the Doppler sensors 51A and 51B are simply referred to as a "Doppler sensor 51". The "Doppler sensor 51" may be referred to as a "radio frequency (RF) sensor 51".

Figure 3:
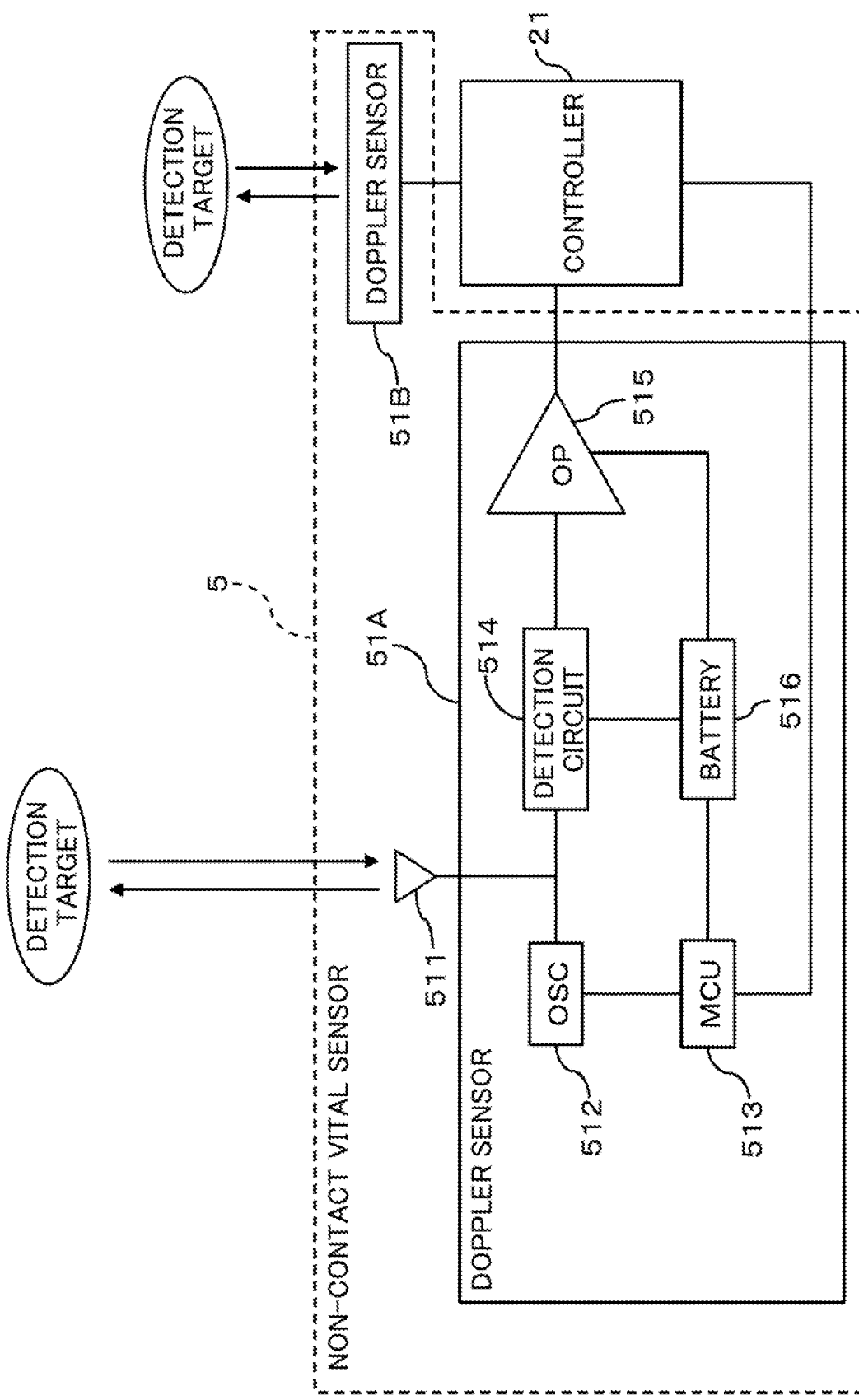
FIG. 3 is a block diagram illustrating a configuration example of the non-contact vital sensor exemplified in FIG. 1 and FIG. 2.
Figure 4:
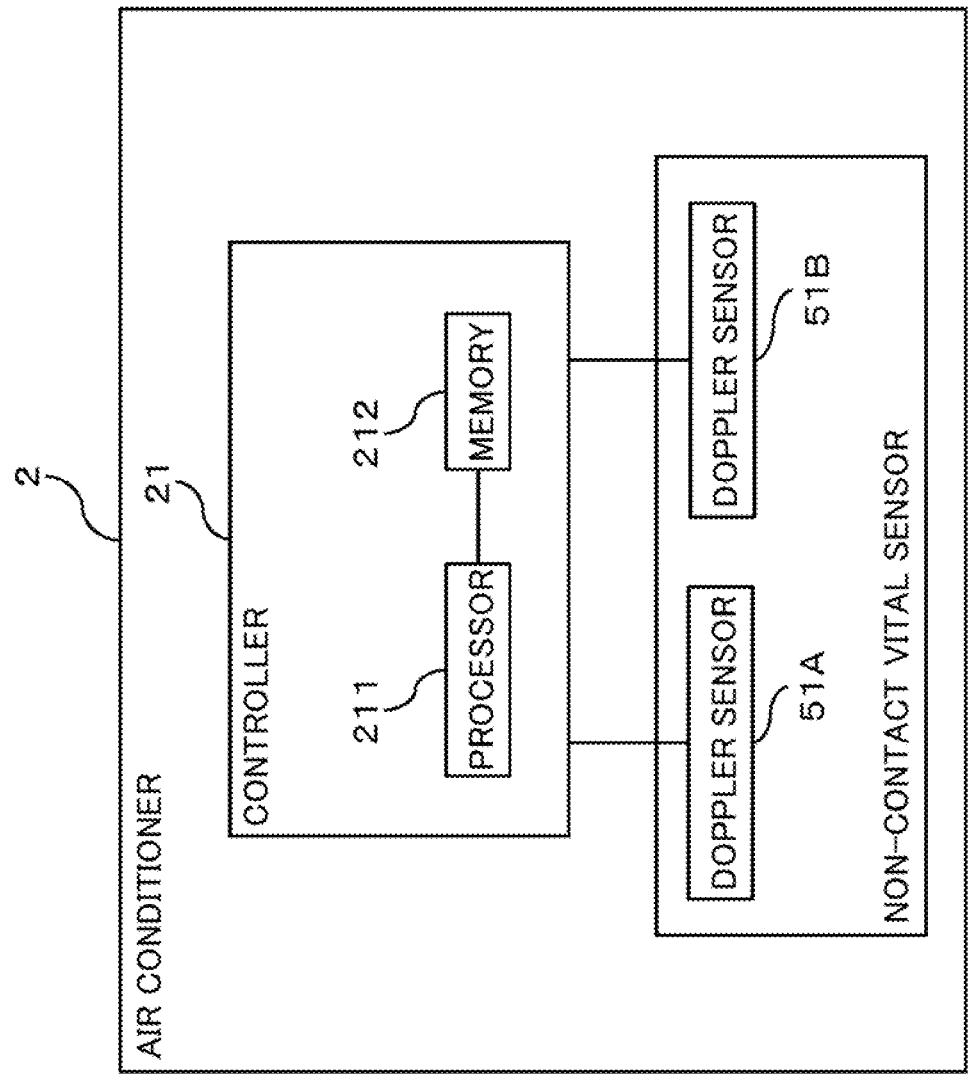
FIG. 4 is a block diagram illustrating a configuration example of the air conditioner exemplified in FIG. 1 and FIG. 2.
Figure 5:
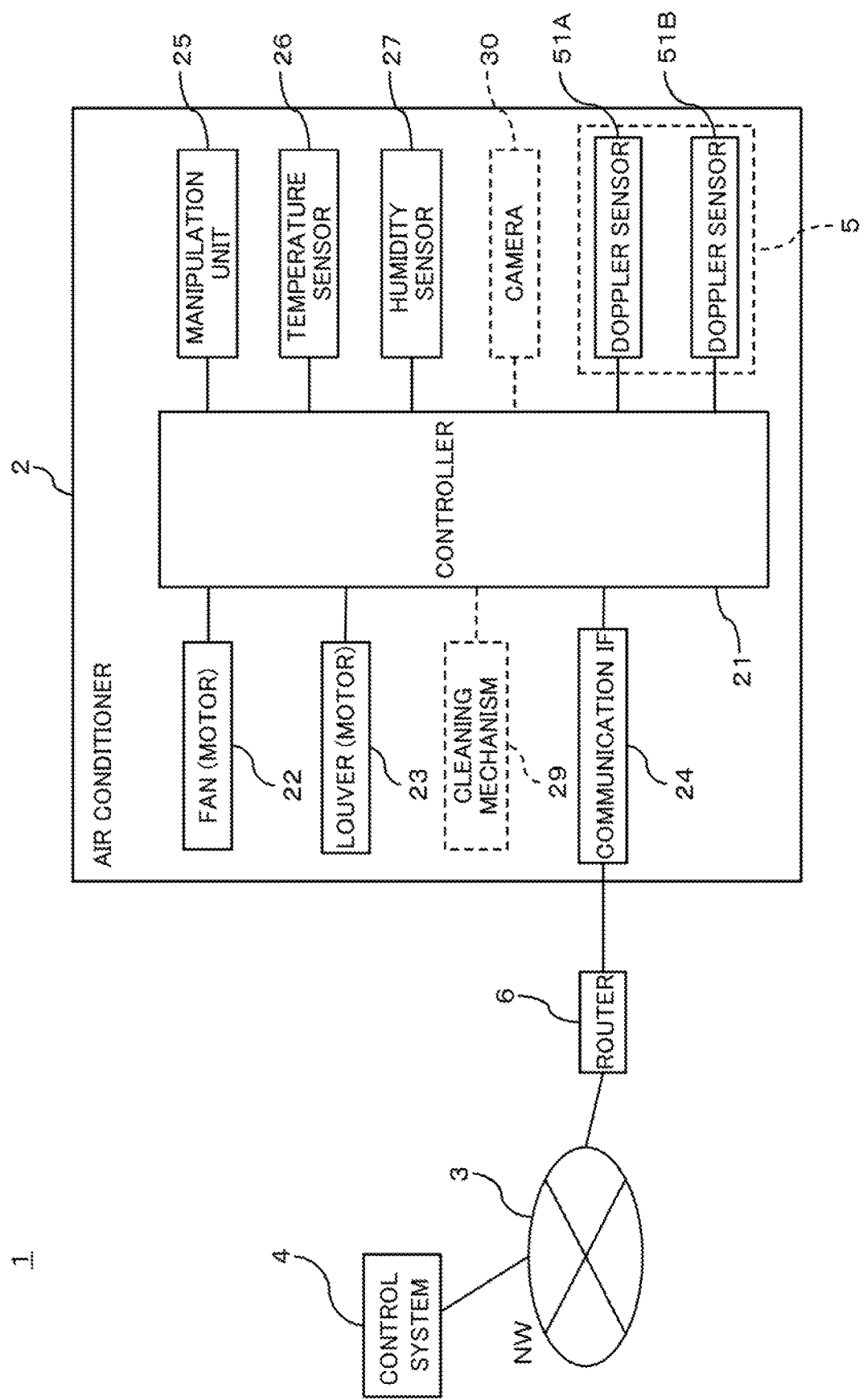
FIG. 5 is a block diagram illustrating a configuration example of an air conditioning system focused on a configuration of the air conditioner exemplified in FIG. 1.

In addition, as illustrated in FIG. 3 to FIG. 5, exemplarily, the Doppler sensors 51A and 51B may be connected to a controller 21 of the air conditioner 2. As illustrated in FIG. 4, exemplarily, the controller 21 may include a processor 211 and a memory 212.

The processor 211 is an example of operational equipment having an operational capacity. The operational equipment may be referred to as an operational device or an operational circuit. Exemplarily, a central processing unit (CPU) or a digital signal processor (DSP) may be applied to the processor 211, which is an example of the operational equipment. Furthermore, the "operational equipment" may be referred to as a "computer".

The memory 212 is an example of a storage medium, and may be a random access memory (RAM), a flash memory, or the like. A program or data, which is read by the processor 211 and is used for operating, may be stored in the memory 212.

The "program" may be referred to as "software" or "application". The "data" may include data which is generated according to the operation of the processor 211.

Furthermore, as exemplified in FIG. 4 and FIG. 5, the Doppler sensors 51A and 51B may be included in one "sensor unit 5" as the non-contact vital sensor 5.

Exemplarily, both of the Doppler sensors 51A and 51B generate a beat signal by performing phase detection with respect to the transmitted electric wave and the reflective wave of the transmitted electric wave. The beat signal may be applied to the controller 21 (for example, the processor 211) as an output signal of the Doppler sensor 51.

As illustrated in FIG. 3, exemplarily, each of the Doppler sensors 51 may include an antenna 511, a local oscillator (OSC) 512, micro control unit (MCU) 513, a detection circuit 514, operational amplifier (OP) 515, and a battery 516. Furthermore, in FIG. 3, the configuration of the Doppler sensor 51B is not illustrated.

The antenna 511 transmits an electric wave having an oscillation frequency which is generated by the OSC 512 to the air-conditioned space, and receives the reflective wave of the transmitted electric wave. Furthermore, in the example of FIG. 3, the antenna 511 may be used for both of transmission and reception, and may be separately used for transmission and reception.

Exemplarily, the OSC 512 performs an oscillation operation according to the control of the MCU 513, and outputs a signal of a predetermined frequency (may be conveniently referred to as a "local signal"). The local signal is transmitted from the antenna 511 as the transmitted electric wave, and is input into the detection circuit 514.

Exemplarily, the oscillation frequency of the OSC 512 may be a frequency in a microwave band. Exemplarily, the microwave band may be a 2.4 GHz band, or may be a 24 GHz band. Such a frequency band is an example of a frequency band which is permitted to be used indoors with Japan Radio Law. A frequency band, which is not subjected to the regulation of the radio law, may be used in the transmitted electric wave of the Doppler sensors 51A and 51B.

Exemplarily, the MCU 513 controls the oscillation operation of the OSC 512 according to the control of the controller 21.

The detection circuit 514 outputs the beat signal by performing the phase detection with respect to the reflective wave received by the antenna 511, the local signal from the OSC 512 (in other words, the transmitted electric wave). Furthermore, the detection circuit 514 may be substituted with a mixer to mix the transmitted electric wave with the reflective wave. The mixing of the mixer may be regarded as the equivalent of the phase detection.

Here, in the beat signal obtained by the detection circuit 514, an amplitude change and a frequency change occurs due to a Doppler effect, according to the "motion" of the user or an object on which the transmitted electric wave is reflected.

For example, the frequency and an amplitude value of the beat signal tend to increase as a change amount in the "motion" (in other words, a relative velocity with respect to the Doppler sensors 51A and 51B) increases.

In other words, the beat signal includes information to represent the "motion" of the user or the object on which the transmitted electric wave is reflected. The "motion" of the user may include a motion according to the practical activities of the user, a motion of a human body surface (in other words, the skin) of the heart beat or the respiration of the user.

A distance between the user and the Doppler sensor 51 is changed due to a change in the human body surface according to the heart beat or the respiration of the user, and thus, the waveform of the beat signal is changed according to the distance change. Therefore, the heart rate or the respiration rate of the user is also capable of being detected on the basis of the waveform change of the beat signal, without being limited to the motion according to the activity of the user.

For example, in the motion according to the activity of the user, the amplitude value of the beat signal tends to be greatly changed, compared to the motion of the human body surface according to the heart beat or the respiration of the user, and thus, it is possible to perform the detection on the basis of the change in the amplitude value.

In contrast, the motion of the human body surface according to the heart beat or the respiration of the user easily occurs as the change in the frequency rather than the change in the change in the amplitude value in the beat signal, and thus, it is possible to perform the detection on the basis of the change in the frequency.

The operational amplifier 515 amplifies the beat signal which is output from the detection circuit 514. The amplified beat signal is input into the processor 211.

Exemplarily, the battery 516 supplies the driving power to the MCU 513, the detection circuit 514, and the operational amplifier 515.

Furthermore, the oscillation frequency of the OSC 512 may be the same or different between the Doppler sensor 51A and the Doppler sensor 51B. On the other hand, an output signal intensity of the OSC 512 may be different between the Doppler sensor 51A and the Doppler sensor 51B.

In other words, the power of a first electric wave which is transmitted from the first Doppler sensor 51A may be different from the power of a second electric wave which is transmitted from the second Doppler sensor 51B. The power of the transmitted electric wave may be referred to as a "transmitted electric wave intensity" or "transmission power".

Exemplarily, transmission power of the Doppler sensor 51A is greater than transmission power of the Doppler sensor 51B. A reachable space range of the electric wave becomes wider as the transmission power increases, and thus, a sensible space range (may be conveniently referred to as a "sensing range") becomes wider.

As a non-attributive example, the first Doppler sensor 51A may be set to transmission power to the extent that the electric wave is capable of reaching the user in the air-conditioned space. In other words, the first Doppler sensor 51A may be set to transmission power according to the range of the air-conditioned space. For example, the first Doppler sensor 51A may be set to transmission power in which the electric wave is capable of reaching in a range of approximately several meters.

In contrast, the second Doppler sensor 51B may be set to transmission power in which the electric wave does not reach the user in the air-conditioned space.

Exemplarily, the second Doppler sensor 51B may be set to weak transmission power to the extent that the electric wave is capable of reaching a portion in which the "motion" may occur in the air conditioner 2 according to the driving of the air conditioner 2 (may be conveniently referred to as a "movable portion"). For example, the second Doppler sensor 51B may be set to transmission power in which the electric wave reaches a range from several centimeters to several dozen centimeters.

Here, in a case where the movable portion of the air conditioner 2 includes a sensing range according to the transmission power of the first Doppler sensor 51A, not only the "motion" of the of the user but also the "motion" of the movable portion of the air conditioner 2 may be detected by the Doppler sensor 51A.

For this reason, a signal component according to the "motion" of the movable portion of the air conditioner 2 may be added to the output signal of the Doppler sensor 51A as a noise component. An example of the movable portion of the air conditioner 2 is a louver which is provided in a blast port of the air conditioner 2 and varies a blast direction.

Wind blown out from the inside of the air conditioner 2 is applied to the louver, and thus, even in a state where the direction of the louver is not controlled and moved during the driving of the air conditioner 2, a minute "motion" (may be referred to as a "vibration") may occur.

Therefore, a signal component according to the vibration of the movable portion of the air conditioner 2 may added to the output signal of the Doppler sensor 51A as the noise component.

Furthermore, the louver is an example of an element configuring a blast mechanism of the air conditioner 2, and the blast mechanism may include a blast fan, motor which performs rotary driving with respect to the blast fan, a motor which varies the direction of the louver, and the like as an example of other elements.

The motor is also an example of the "movable portion", and a signal component according to a vibration due to the motion of the motor may be added to the output signal of the Doppler sensor 51A as the noise component. Therefore, the "movable portion" of the air conditioner 2 may be referred to as a "noise source NS" of the Doppler sensor 51A. The noise source NS may include an element relevant to a cleaning mechanism of the air conditioner 2 described below.

Thus, in a case where the Doppler sensor 51A is mounted in the air conditioner 2, there is a case where the Doppler sensor 51A detects not only the motion of the user in the air-conditioned space but also the motion of the noise source NS of the air conditioner 2.

For example, there is a case where a vibration component according to the operation of the motor or the louver may be generated on the output signal of the Doppler sensor 51A as the frequency change. The frequency change according to the vibration is a noise component with respect to the frequency change according to the motion of the human body surface due to the heart beat or the respiration of the user who is the sensing target.

In addition, in a case where the direction of the louver is controlled and the louver is moved, there is a case where the motion occurs on the output signal of the Doppler sensor 51A as an amplitude value change. The amplitude value change is a noise component with respect to the amplitude value change according to the motion due to the activity of the user who is the sensing target.

In a case where the noise component according to the motion of the noise source NS of the air conditioner 2 is added to the output signal of the Doppler sensor 51A, a detection accuracy of the vital information of the sensing target may decrease. As a result thereof, the accuracy of the sleep determination based on the vital information, or the accuracy or the efficiency of the air conditioning control may decrease.

Therefore, in this embodiment, the motion of the noise source NS is detected according to the second Doppler sensor 51B, and the signal component according to the motion of the noise source NS (in other words, a "noise component") is cancelled or reduced from the output signal of the Doppler sensor 51A.

For this reason, a sensing range of the second Doppler sensor 51B is may be set to overlap with a range including the noise source NS, in the sensing range of the first Doppler sensor 51A.

In other words, the first Doppler sensor 51A may be set to transmission power in which the electric wave is capable of reaching the noise source NS and the user who may be positioned in the air-conditioned space, and the second Doppler sensor 51B may be set to transmission power in which the electric wave reaches the movable portion of the air conditioner 2 but does not reach the user.

In other words, the transmission power of the first Doppler sensor 51A may be set such that the air-conditioned space of the air conditioner 2 is the sensing target, and the transmission power of the second Doppler sensor 51B may be set such that the noise source NS of the air conditioner 2 is the sensing target.

According to such setting, both of the motion of the user and the motion of the noise source NS are detected by the first Doppler sensor 51A, and the motion of the noise source NS is detected by the second Doppler sensor 51B.

Therefore, in a case where a difference between detection results of the respective Doppler sensors 51A and 51B, it is possible to cancel or reduce the signal component according to the motion of the noise source NS due to the driving of the air conditioner 2, from the detection result of the Doppler sensor 51A.

Therefore, it is possible to accurately detect the signal component according to the motion of the user (in other words, the vital information) without being affected by the operation of the air conditioner 2, and to improve a detection accuracy of the vital information. According to the improvement in the detection accuracy of the vital information, it is possible to improve the accuracy of the sleep determination based on the vital information, or the accuracy or the efficiency of the air conditioning control.

Furthermore, cancelling or reducing the output signal of the second Doppler sensor 51B from the output signal of the first Doppler sensor 51A may be regarded as correcting the output signal of the first Doppler sensor 51A with the output signal of the second Doppler sensor 51B.

Each of the output signals of the Doppler sensors 51A and 51B may be referred to as a "detection value" or a "sensor value". The sensor value of the first Doppler sensor 51A may be conveniently referred to as a "first Doppler sensor value". The sensor value of the second Doppler sensor 51B may be conveniently referred to as a "second Doppler sensor value".

The operation or the processing based on the first Doppler sensor value and the second Doppler sensor value may be performed by the controller 21 of the air conditioner 2 (for example, the processor 211), or may be performed by the control system 4 (for example, a processor 41 described below in FIG. 6).

The processor 211 of the controller 21 or the processor 41 of the control system 4 may be regarded as an example of a detection unit which detects the vital information of the user in the air-conditioned space, on the basis of the first Doppler sensor value and the second Doppler sensor value. The function of the detection unit may be realized by an individual processor built in the sensor unit 5.

Furthermore, a power source for the Doppler sensors 51A and 51B may be shared with the air conditioner 2 (for example, the controller 21), or may be individual from the air conditioner 2.

Insofar as power feeding is capable of being performed with respect to the Doppler sensors 51A and 51B from an individual power source, the air conditioner 2 is capable of performing sensing of the Doppler sensors 51A and 51B even in a case where the power source of the air conditioner 2 is turned OFF. In other words, the non-contact vital sensor 5 is capable of functioning as a single sensor 5 even in a case where the air conditioner 2 is not operated, and thus, is capable of being used as a "watch function".

(Configuration Example of Air Conditioner 2)

FIG. 5 is a block diagram illustrating a configuration example of the air conditioning system 1 focused on the configuration of the air conditioner 2. Exemplarily, the air conditioner 2 illustrated in FIG. 5 includes the controller 21. The controller 21 controls the driving of the air conditioner 2.

Exemplarily, a motor which drives a blast fan 22 of the air conditioner 2 and a motor which drives a louver 23 of the air conditioner 2 may be connected to the controller 21, in addition to the Doppler sensors 51A and 51B described above. The blast fan 22 is an example of a blast machine, and exemplarily, may be a cross flow fan. The louver 23 is an example of a wind direction adjuster, and may be referred to as an "air wing 23".

The cross flow fan 22 is controlled by the controller 21, and thus, for example, it is possible to control the blast volume of the air conditioner 2. The air wing 23 is controlled by the controller 21, and thus, for example, it is possible to control the blast direction of the air conditioner 2.

In addition, exemplarily, a communication IF 24, a manipulation unit 25, a temperature sensor 26, and a humidity sensor 27 may be connected to the controller 21.

The communication IF 24 is an interface which is connected to the router 6, and is capable of communicating with the control system 4 through the network 3. Exemplarily, an Ethernet (Registered Trademark) card may be applied to the communication IF 24.

Focusing on transmission processing, the communication IF 24 is an example of a transmitter which transmits information to the control system 4, and focusing on receiving processing, the control system 4 is an example of a receiver which receives the information transmitted to the air conditioner 2.

The information to be transmitted to the control system 4 may include the sensor values of the Doppler sensors 51A and 51B. In addition, the information to be transmitted to the control system 4 may include vital information of the user obtained by the controller 21 on the basis of the Doppler sensor value, a result of determining the state of the user by the controller 21 on the basis of the vital information, and the like.

The manipulation unit 25 is manipulated by the user of the air conditioner 2, and inputs a signal according to the manipulation (may be conveniently referred to as a "manipulation signal") into the controller 21. Control according to the manipulation signal is performed by the controller 21.

Furthermore, the manipulation unit 25 may correspond to a manipulation panel attached to the main body of the air conditioner 2, and for example, may correspond to a remote controller for remotely controlling the driving of the air conditioner 2 by infrared ray communication.

The temperature sensor 26 senses the temperature of the air-conditioned space. The humidity sensor 27 senses the humidity of the air-conditioned space. The controller 21 may adaptively control the blast fan 22 or the louver 23 on the basis of the sensor information of one or both of the temperature sensor 26 and the humidity sensor 27.

Furthermore, a cleaning mechanism 29 may be connected to the controller 21. Exemplarily, the cleaning mechanism 29 may be a mechanism for the air conditioner 2 to autonomously clean a filter of the air conditioner 2. Exemplarily, the cleaning of the cleaning mechanism 29 may be performed according to OFF of the power source of the air conditioner 2.

In addition, a camera 30 may be connected to the controller 21. The camera 30 may capture the shape of the air-conditioned space. Image data captured by the camera 30 may be included in the information to be transmitted to the control system 4 from the communication IF 24. The image data may be still image data, or may be dynamic image data.

The image data of the camera 30 received by the control system 4 may be accessed from an information terminal. The information terminal, for example, may be a terminal which is possessed by the user of the air conditioner 2 or the family of the user, or may be a terminal which is possessed by a security company authorized to monitor the air-conditioned space. A personal computer (PC), a mobile phone (may include a smart phone), a tablet PC, and the like may correspond to the information terminal.

The information terminal refers to the image data of the air-conditioned space, which is received by the control system 4, and thus, it is possible for the user of the air conditioner 2 or the family of the user, the security company, or the like to monitor and confirm the shape of the air-conditioned space in a remote location separated from the air-conditioned space.

(Configuration Example of Control System 4)

Figure 6:
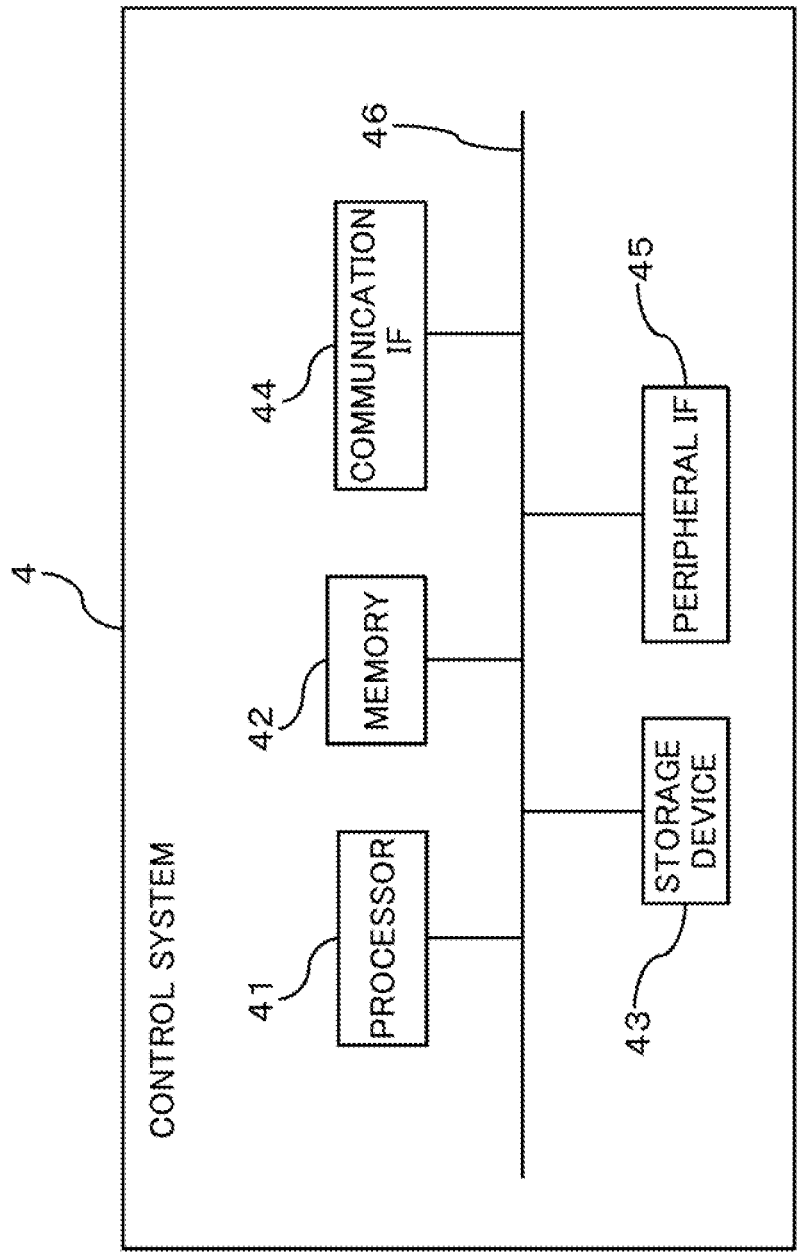
FIG. 6 is a block diagram illustrating a configuration example of a control system used for the air conditioning system exemplified in FIG. 1.

FIG. 6 is a block diagram illustrating a configuration example of the control system 4 exemplified in FIG. 1. Exemplarily, the control system 4 illustrated in FIG. 6 may include the processor 41, a memory 42, a storage device 43, a communication interface (IF) 44, and a peripheral IF 45.

Exemplarily, the processor 41, the memory 42, the storage device 43, the communication IF 44, and the peripheral IF 45 may be connected to each other to communicate with each other through a bus 46.

Exemplarily, the processor 41 controls an operation as the control system 4. The controlling may include controlling communication with respect to the network 3, or as described above, remotely controlling the air conditioner 2 through the network 3.

For example, the processor 41 may generate a control signal of controlling the driving of the air conditioner 2, on the basis of the sensor information of the non-contact vital sensor 5, which is received by the communication IF 44. The control signal may be transmitted to the air conditioner 2 from the communication IF 44. The control signal transmitted to the air conditioner 2 may be received by the air conditioner 2 (for example, the communication IF 24) through network 3 and the router 6.

Furthermore, the processor 41 is an example of operational equipment having an operational capacity, as with the processor 211 in the controller 21 of the air conditioner 2. The operational equipment may be referred to as an operational device or an operational circuit. Exemplarily, a CPU or a DSP may be applied to the processor 41, which is an example of the operational equipment.

The memory 42 is an example of a storage medium, and may be a RAM, a flash memory, or the like. A program or data, which is read by the processor 41 and is used for the operation, may be stored in the memory 42.

The "program" may include a program of controlling the driving of the air conditioner 2. The "data" may include the data generated according to the operation of the processor 42, the control signal with respect to the air conditioner 2, or the like.

Exemplarily, the storage device 43 may store the sensor information of the non-contact vital sensor 5, which is received by the communication IF 44. Exemplarily, the sensor information may be database (DB) in the storage device 43. The data of DB may be referred to as "cloud data", "big data", or the like. Furthermore, exemplarily, a hard disk drive (HDD), a solid state drive (SSD), or the like may be applied to the storage device 43.

Exemplarily, the communication IF 44 is connected to the network 3, and is capable of communicating with the air conditioner 2 through the network 3. Focusing on the receiving processing, the communication IF 44 is an example of the receiver which receives the information transmitted to the control system 4 from the non-contact vital sensor 5. On the other hand, focusing on the transmission processing, the communication IF 44, for example, is an example of the transmitter which transmits the control signal with respect to the air conditioner 2, which is generated by the processor 41. Exemplarily, an Ethernet (Registered Trademark) card may be applied to the communication IF 44.

Exemplarily, the peripheral IF 45 is an interface for connecting a peripheral device to the control system 4. The peripheral device may include an input device for inputting the information into the control system 4, and an output device for outputting the information obtained by the control system 4. The input device may include a keyboard or a mouse, a touch panel, and the like. The output device may include a display, a printer, and the like.

(Arrangement Relationship of Doppler Sensors 51A and 51B)

Next, an example of an arrangement relationship between two Doppler sensors 51A and 51B will be described with reference to FIG. 7 and FIG. 8.

Figure 7:
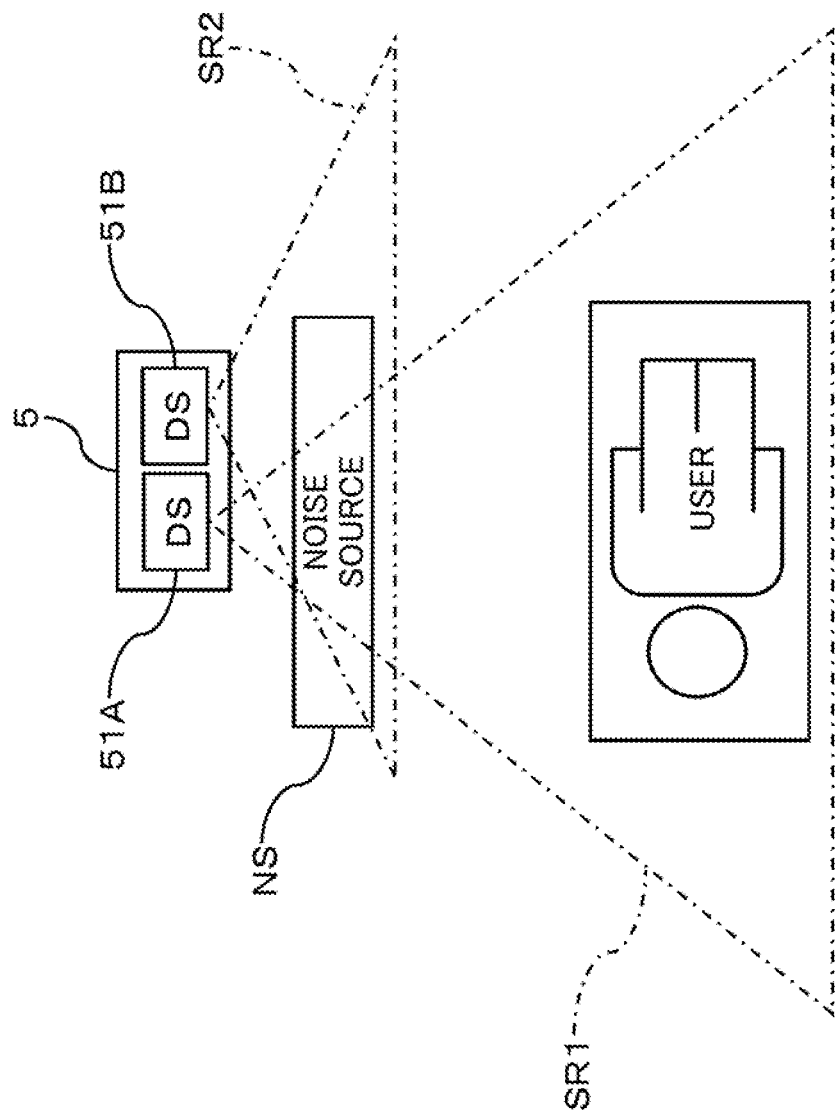
FIG. 7 is a diagram schematically illustrating an example of an arrangement relationship of Doppler sensors exemplified in FIG. 1 to FIG. 4.

As schematically exemplified in FIG. 7, the first Doppler sensor 51A may be disposed in a position where the air-conditioned space, in which the user may be positioned, is observed by the electric wave from the inside of the air conditioner 2.

In other words, the first Doppler sensor 51A may be disposed in the air conditioner 2 such that the user, who is the sensing target of the vital information, is included in a sensing range SR1.

In contrast, the second Doppler sensor 51B may be disposed in a position where the noise source NS (for example, the louver 23) included in the sensing range SR1 of the Doppler sensor 51A is observed by the electric wave, in the air conditioner 2.

In other words, the second Doppler sensor 51B may be disposed in the air conditioner 2 such that the noise source NS, which is included in the sensing range SR1 of the Doppler sensor 51A, is included in a sensing range SR2. Here, the sensing range SR2 of the second Doppler sensor 51B may be set such that the user who is the sensing target of the vital information is not included therein.

The "observed position" may be regarded as a position where an object, which may inhibit the electric wave by absorbing or reflecting (or shielding) the transmitted electric wave of the Doppler sensor 51, does not exist between the Doppler sensor 51 and the sensing target (for example, the user or the noise source NS).

Figure 8:
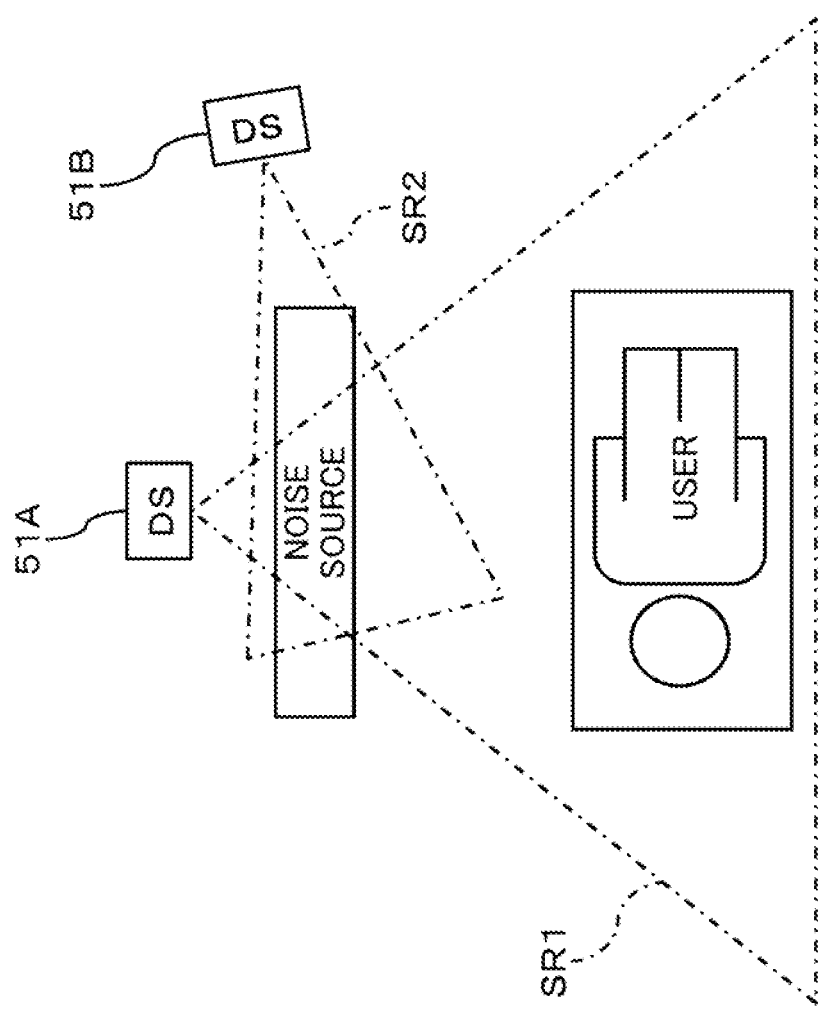
FIG. 8 is a diagram schematically an example of the arrangement relationship of the Doppler sensors exemplified in FIG. 1 to FIG. 4.

Furthermore, FIG. 7 illustrates an example where the Doppler sensors 51A and 51B are integrated as one sensor 5, but as schematically exemplified in FIG. 8, there is a case where the Doppler sensors 51A and 51B are not integrated as one sensor 5.

For example, the Doppler sensors 51A and 51B may be disposed in individually different positions, in the air conditioner 2. The "different positions" may be positions different in a horizontal direction or positions different in a vertical direction in the air conditioner 2, or may be positions different in both of the horizontal direction and the vertical direction.

An arrangement relationship may be obtained in which the sensing target of the vital information is included in the sensing range SR1 of the first Doppler sensor 51A, and the noise source NS, which is not the sensing target of the vital information, is included in the sensing range SR2 of the second Doppler sensor 51B.

Figure 9:
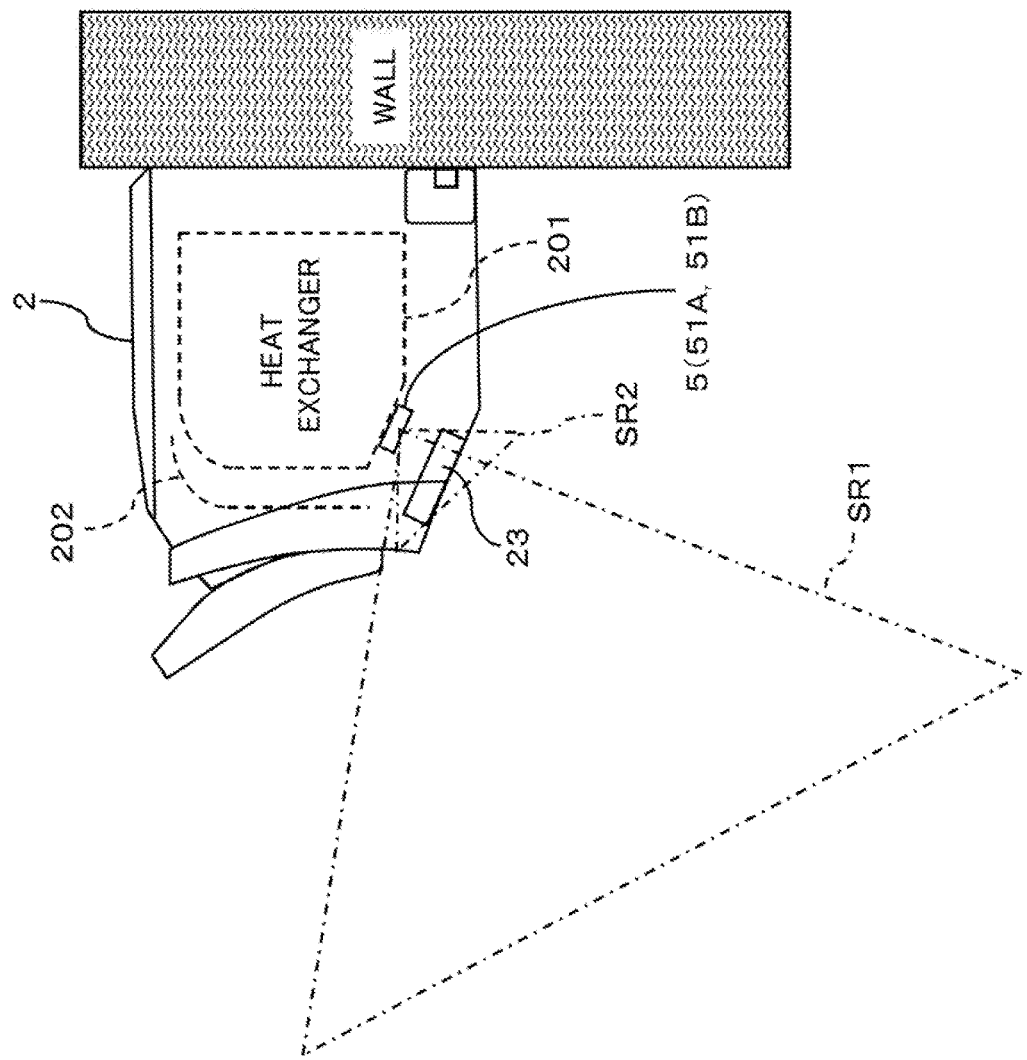
FIG. 9 is a schematic side view of the air conditioner for illustrating an example of the arrangement relationship of the Doppler sensors exemplified in FIG. 1 to FIG. 4.

FIG. 9 is a schematic side view of the air conditioner 2. Exemplarily, the air conditioner 2 may include a heat exchanger 201. In addition, exemplarily, an air cleaning filter 202 may be provided in an internal space between the heat exchanger 201 and a front housing of the air conditioner 2 (may be referred to as a "front panel"). The front panel is an example of a housing of the air conditioner 2 on the air-conditioned space side.

The heat exchanger 201 is formed of a metal, and shields the electric wave. For this reason, the Doppler sensors 51A and 51B may be provided in a space avoiding the a heat exchanger 201, for example, a space between the heat exchanger 201 and the front panel of the air conditioner 2, in the air conditioner 2.

In a case where there is a space between the heat exchanger 201 and the air cleaning filter 202, the Doppler sensors 51 and 51B may be disposed in the space.

Furthermore, there is a case where the housing of the air conditioner 2 is worked according to the position of the louver 23, which is an example of the noise source NS, disposed in the blast port, and the shape of the heat exchanger 201 is also worked according to the worked shape.

For example, as schematically illustrated in FIG. 9, there is a case where a part of the front housing of the air conditioner 2 is worked to be obliquely downward with respect to a horizontal surface in order to dispose the louver 23. This is because the blast of the air conditioner 2 is capable of being performed to be obliquely downward.

There is a case where the shape of the heat exchanger 201 in the air conditioner 2 is worked such that a surface of the housing of the air conditioner 2 facing an "obliquely downward surface" is formed, according to the working of the housing.

In such a case, as described above, there are many cases where in the "obliquely downward surface" of the heat exchanger 201, both the user in the air-conditioned space and the louver 23, which is an example of the noise source NS, are the "observed position".

For example, in a case where the Doppler sensors 51A and 51B are disposed such that the louver 23 faces the "obliquely downward surface" of the heat exchanger 201, it is possible to observe the air-conditioned space by the transmitted electric wave of the Doppler sensor 51A through the louver 23. In addition, it is possible to observe the louver 23 by the transmitted electric wave of the Doppler sensor 51B.

Furthermore, a position where the first Doppler sensor 51A is disposed to face the louver 23 is an example of a "first position", and a position where the second Doppler sensor 51B is disposed to face the louver 23 is an example of a "second position".

In a case where the Doppler sensors 51A and 51B are included in one sensor unit 5, the "first position" and the "second position" may be regarded as different positions in the sensor unit 5, which are disposed to face the louver 23.

Figure 10:
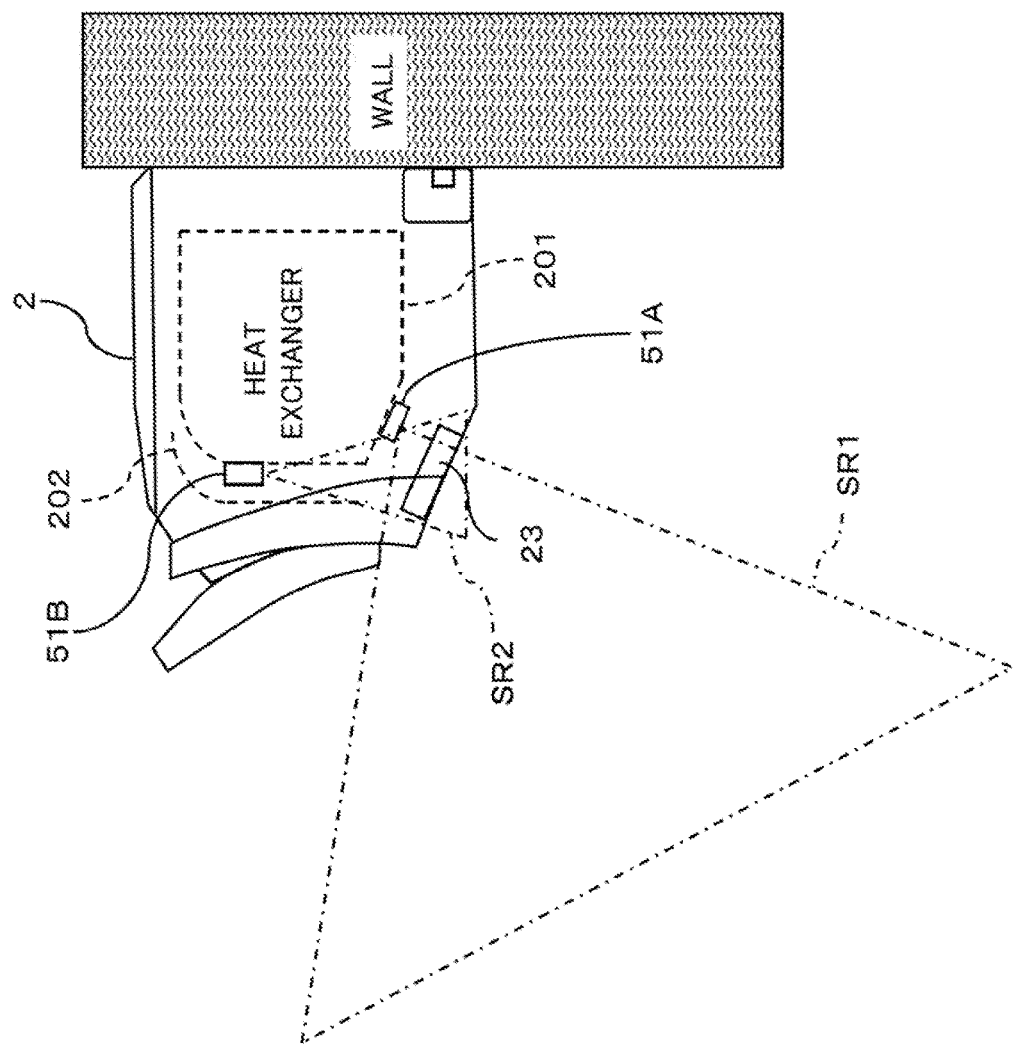
FIG. 10 is a schematic side view of the air conditioner for illustrating an example of the arrangement relationship of the Doppler sensors exemplified in FIG. 1 to FIG. 4.

In a case where the Doppler sensors 51A and 51B are individually disposed in the air conditioner 2, the Doppler sensors 51A and 51B may be arranged as schematically exemplified in FIG. 10.

For example, the first Doppler sensor 51A may be disposed on the "obliquely downward surface" of the heat exchanger 201, and the second Doppler sensor 51B, for example, may be disposed in a different position, in which the noise source NS is capable of being observed by the electric wave.

Furthermore, the air conditioner 2, in which the Doppler sensors 51A and 51B are built in, is not limited to a "wall-hanging" type air conditioner, and may be an air conditioner which is attached to a "ceiling" of the air-conditioned space (may be conveniently referred to as a "ceiling-embedded" type air conditioner).

Even in a case of the "ceiling-embedded" type air conditioner 2, the first Doppler sensor 51A is provided in a position where the air-conditioned space may be observed by the electric wave through the noise source NS, and the second Doppler sensor 51B may be provided in a position where the noise source NS is observed by the electric wave.

OPERATION EXAMPLE

Hereinafter, an operation example of the air conditioning system 1 described above will be described. Furthermore, the operation example described below is an operation example including processing of cancelling or reducing the detection value of the second Doppler sensor 51B from the detection value of the first Doppler sensor 51A.

The detection value of the second Doppler sensor 51B corresponds to the noise component according to the motion of the noise source NS. Therefore, the processing of cancelling or reducing the detection value of the second Doppler sensor 51B from the detection value of the first Doppler sensor 51A may be conveniently and collectively referred to as "noise canceling".

In addition, hereinafter, an example will be described in which the "noise canceling" is performed by the control system 4 (for example, the processor 41). Here, a part or all of the processing relevant to the "noise canceling" may be performed by the controller 21 of the air conditioner 2 (for example, the processor 211).

First Example

Figure 11:
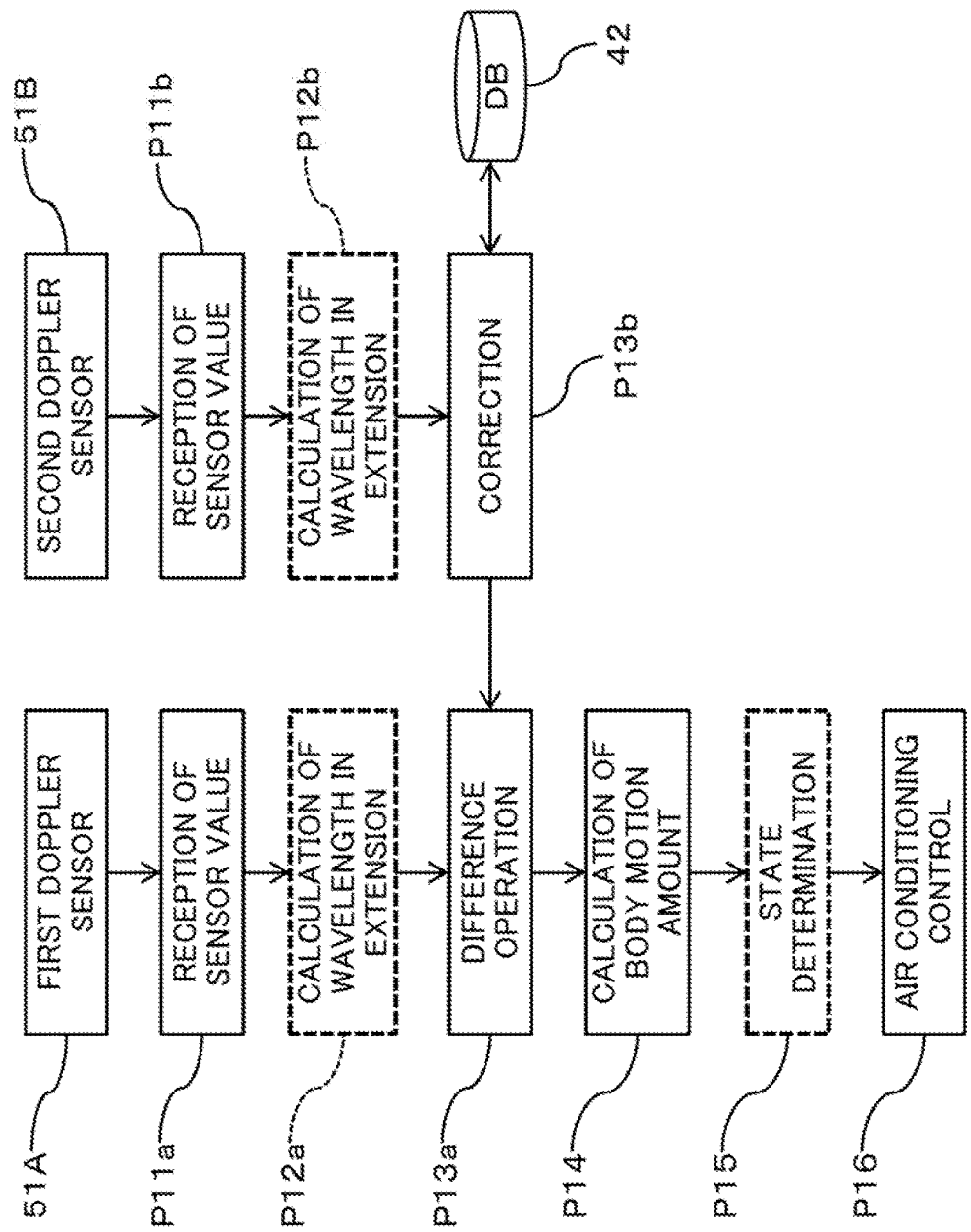
FIG. 11 is a flowchart for illustrating an operation example including noise canceling according to a first example of the air conditioning system exemplified in FIG. 1.

FIG. 11 is a flowchart illustrating the operation example of the air conditioning system 1 including noise canceling according to a first example.

As exemplified in FIG. 11, the control system 4 receives the sensor information which is transmitted to the control system 4 from the non-contact vital sensor 5. Exemplarily, the sensor information includes the sensor value of the Doppler sensor 51A and the sensor value of the Doppler sensor 51B. Exemplarily, such Doppler sensor values are received by the communication IF 44 of the control system 4, and are input into processor 41 of the control system 4 (processing P11a and processing P11b).

Exemplarily, the processor 41 may calculate the "body motion amount" of the user in the air-conditioned space on the basis of the first Doppler sensor value. In a case where the body motion amount is greater than a determination threshold value, it may be determined that the user is awake, and in a case where the body motion amount is less than the determination threshold value, it may be determined that the user is sleeping.

The "body motion amount" of the user is capable of being regarded as a time change in the Doppler sensor value. For example, in a case where the user, who is the sensing target, is awake and active, the body motion of the sensing target occurs as a change in the amplitude value and the frequency of the Doppler sensor value.

For example, the amplitude value and the frequency of the Doppler sensor value tend to increase as the body motion amount of the user increases. In a case where the user is at rest such as during sleeping, the body motion of the user is dominated by a change in the heart beat or the respiration. For this reason, it may be considered that the amplitude value of the Doppler sensor value is not changed or even in a case where there is a change, the change may be neglected.

Therefore, it may be considered that the body motion due to the change in the heart beat or the respiration occurs as a frequency change in the Doppler sensor value. For example, the frequency of the Doppler sensor value tends to increase as the heart rate or the respiration rate increases.

Therefore, it is possible to detect the body motion amount on the basis of the change in the amplitude value and the frequency of the Doppler sensor value. The change in the amplitude value and the frequency of the Doppler sensor value, for example, is capable of being regarded as a change in a length at the time of linearly extending a signal waveform of the Doppler sensor value (in other words, the time change) in a time region.

The length at the time of linearly extending the signal waveform in the time region may be conveniently referred to as a "wavelength in extension". Therefore, the "wavelength in extension" is a concept different from a general "wavelength". The "wavelength in extension" may be regarded as corresponding to a length of a trajectory which is drawn by the Doppler sensor value in the time region, in certain unit time. Furthermore, the unit time may be "second" unit, or may be "minute" unit.

Figure 12:
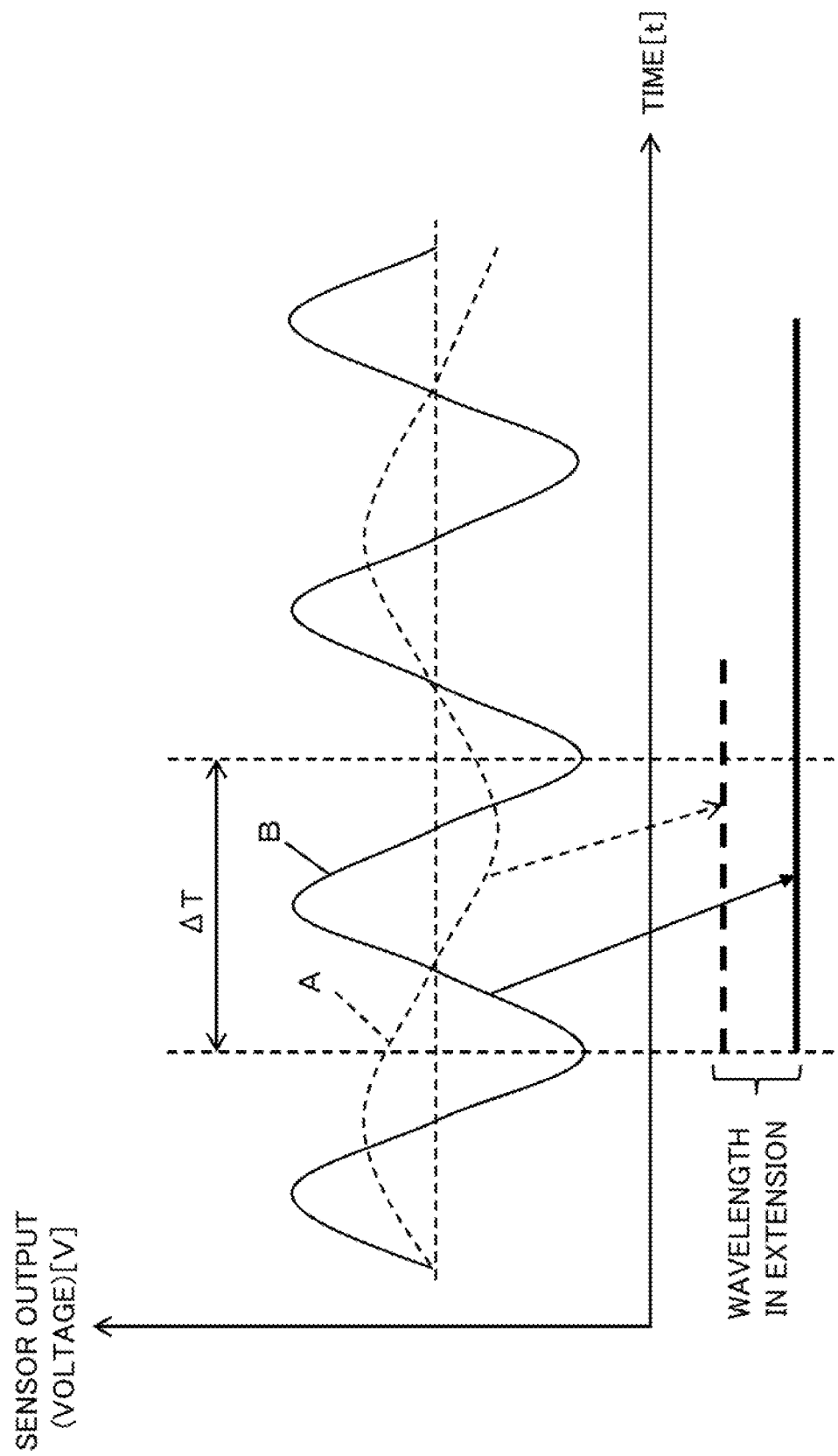
FIG. 12 is a diagram schematically exemplifying a concept of a wavelength in extension according to an embodiment.

FIG. 12 schematically exemplifies the concept of the "wavelength in extension". A horizontal axis of FIG. 12 represents time (t), and a vertical axis of FIG. 12 represents the Doppler sensor value (for example, a voltage [V]).

In FIG. 12, exemplarily, a signal waveform illustrated by a dotted line A schematically represents a time change in the Doppler sensor value when the user, who is the sensing target, is sleeping. A signal waveform illustrated by a solid line B schematically illustrates a time change in the Doppler sensor value when the user, who is the sensing target, is awake and active.

As exemplified in a lower portion of FIG. 12, the "wavelength in extension" corresponds to a length at the time of linearly extending the signal waveforms per unit time ($\Delta T$), which are illustrated by the dotted line A and the solid line B, in a time direction.

Exemplarily, the "wavelength in extension" is capable of being calculated by sequentially storing the Doppler sensor value in the memory 42 during a certain period (may be referred to as a "sampling period") (refer to FIG. 6), and by adding a change amount of the amplitude value over the unit time.

A calculation example of the "wavelength in extension" will be described with reference to FIG. 13. A horizontal axis of FIG. 13 represents time (t), and a vertical axis of FIG. 13 represents the Doppler sensor value (for example, a voltage [V] corresponding to the amplitude value).

Figure 13:
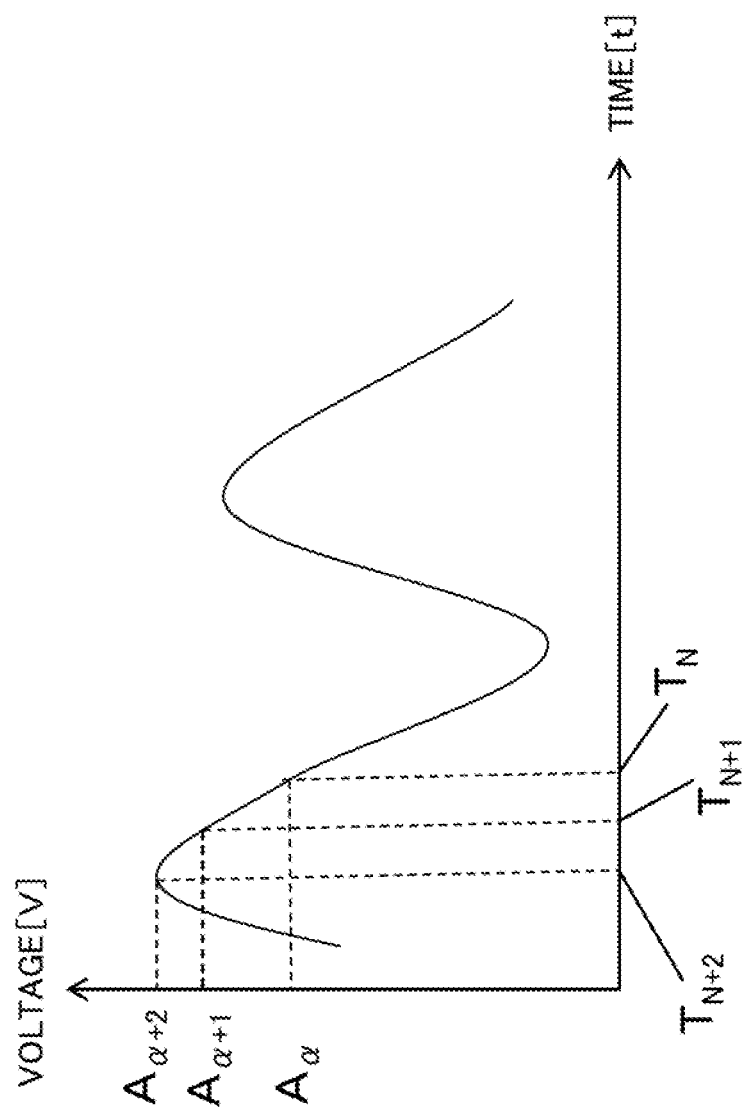
FIG. 13 is a diagram for illustrating calculation example of the wavelength in the extension according to an embodiment.

In the signal waveform exemplified in FIG. 13, the Doppler sensor value is "$A\alpha+2$", "$A\alpha+1$", and "$A\alpha$" in each of certain timings $t=TN+2$, $t=TN+1$, and $t=TN$.

Furthermore, "N" is an integer which represents the label of the timing. "A" is a real number that a voltage value [V] may have, and "$\alpha$" is an integer which represents the label of the voltage value. Each of the timings $t=TN+2$, $t=TN+1$, and $t=TN$ may be referred to as a "sampling timing". The interval of the sampling timings may be constant or may be different.

Exemplarily, the processor 41 obtains an amplitude change amount between the sampling timings, on the basis of the amplitude value (the voltage value) obtained in each of the sampling timings. For example, the processor 41 may obtain a difference in the amplitude values between the adjacent sampling timings as the amplitude change amount between the sampling timings.

Exemplarily, the processor 41 may obtain an amplitude change amount between the sampling timing $t=TN+2$ and the next sampling timing $t=TN+1$ as an absolute value $|A\alpha+1 - A\alpha+2|$. Similarly, the processor 41 may obtain an amplitude change amount between the sampling timing $t=TN+1$ and the next sampling timing $t=TN$ as an absolute value $|A\alpha - A\alpha+1|$.

The processor 41 repeatedly performs such an operation over the number of times of sampling per unit time, and adds the obtained amplitude change amount as $|A\alpha - A\alpha+1| + |A\alpha+1 - A\alpha+2| + \ldots$, and thus, it is possible to calculate the "wavelength in extension".

Furthermore, as exemplified in FIG. 13, in a case where the Doppler sensor value is represented by the voltage value [V], the unit of the "wavelength in extension", for example is represented by "voltage/time" (V/min).

In addition, in a case where the number of samplings of the amplitude value per unit time is excessively small, a calculation accuracy of the "wavelength in extension" decreases, and in a case where the number of samplings of the amplitude value per unit time is excessively large, an operational load may increase or an operational delay or the like may occur, and thus, it is preferable that number of samplings of the amplitude value per unit time is set in an actual range. Further, the "wavelength in extension" may be time-averaged over predetermined time. For example, the average of 60 "wavelengths in extension" obtained for 1 minute by setting the unit time as 1 second may be used.

Figure 14:
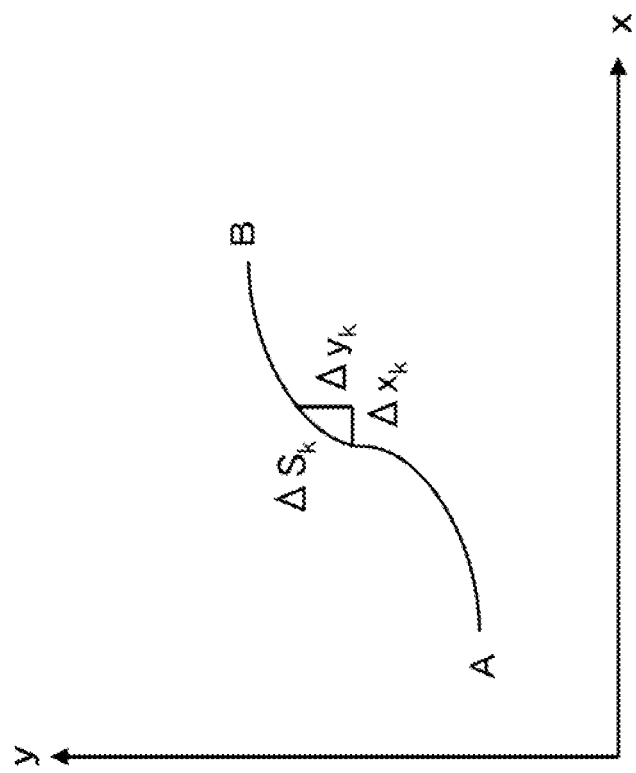
FIG. 14 is a diagram illustrating another calculation example of the wavelength in the extension according to an embodiment.

Furthermore, the processor 41 may calculate the "wavelength in extension" as follows. For example, FIG. 14 illustrates an example of calculating the "wavelength in extension" of a curve AB. A length between AB is divided into n minute sections, each of the minute sections is approximated by a line segment, and a sum Sn of the lengths is represented by Expression 1 described below.

$$n = \sum_{k=1}^{n} \Delta S_k \qquad \text{[Expression 1]}$$

In a case where minute displacement in an x direction in the minute section is set to $\Delta x_k$, and a minute displacement in a y direction is set to $\Delta y_k$, $\Delta S_k$ is represented by Expression 2 described below, according to the Pythagorean theorem.

$$\Delta S_k = \sqrt{(\Delta x_k)^2 + (\Delta y_k)^2}$$ [Expression 2]

As represented in Expression 3 described below, in a case where the number n of minute sections of Expression 2 increases to infinity, the sum Sn is close to a length L of the curve AB.

$$L = \lim_{n \to \infty} S_n = \lim_{n \to \infty} \sum_{k=1}^{n} \Delta x_k = \lim_{n \to \infty} \sum_{k=1}^{n} \sqrt{(\Delta x_k)^2 + (\Delta y_k)^2}$$ [Expression 3]

In Expression 3, in a case where the x direction is set to a time axis, and the sampling period of the Doppler sensor value is constant (for example, 1 kHz), "xk" is constant, and "yk" is substituted with the Doppler sensor value (the amplitude value), and thus, the "wavelength in extension" is calculated. Furthermore, exemplarily, time between AB is 60 seconds.

Figure 15:
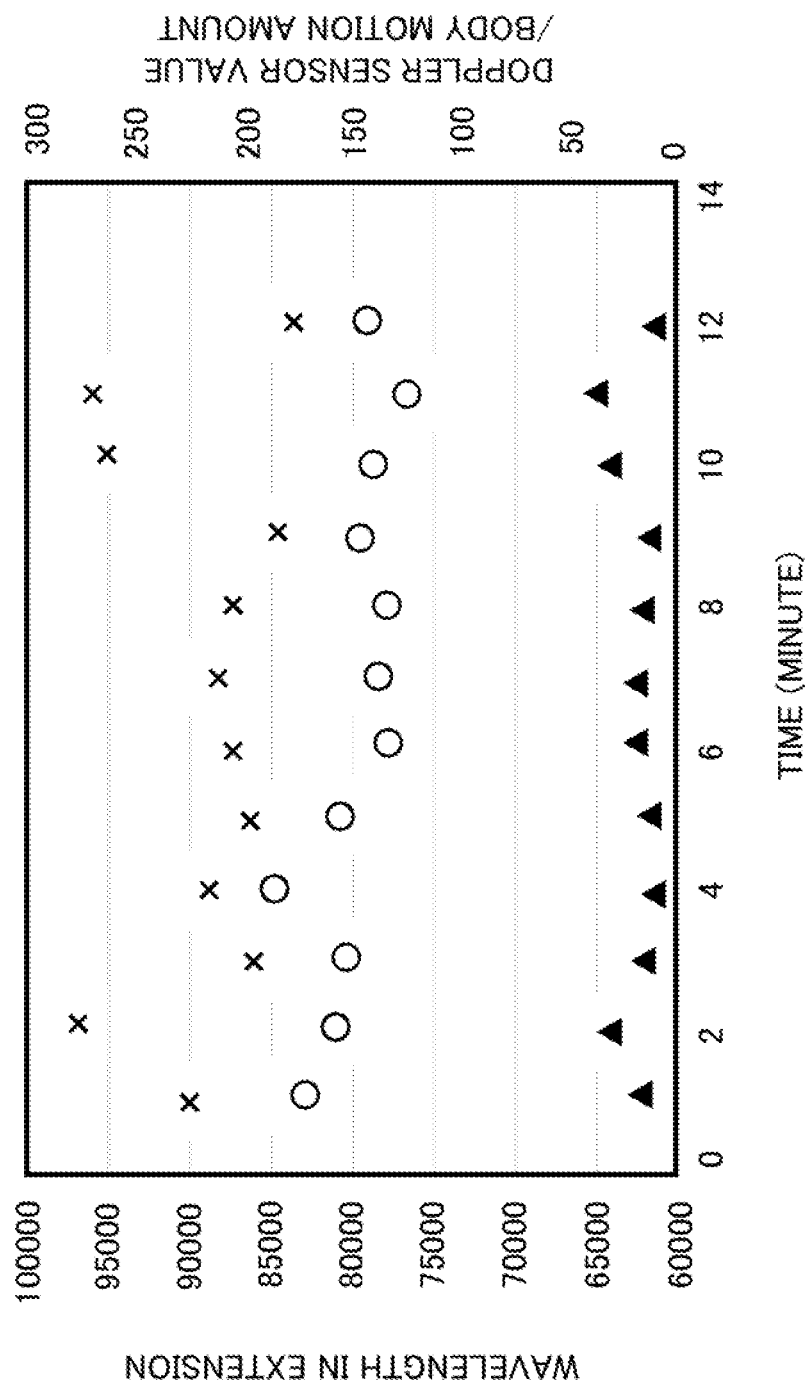
FIG. 15 is a diagram illustrating an example of a time change in a Doppler sensor value and a body motion amount according to an embodiment.

As described above, the processor 41 may calculate the "wavelength in extension" with respect to each of the first Doppler sensor value and the second Doppler sensor value (processing P12a and processing P12b of FIG. 11). FIG. 15 illustrates an example of a time change in the "wavelength in extension" which is calculated on the basis of the first Doppler sensor value and the second Doppler sensor value.

In FIG. 15, a point plotted by a mark of "×" represents the "wavelength in extension" which is calculated on the basis of the sensor value of the first Doppler sensor 51A. In addition, in FIG. 15, a point plotted by a mark of "○" represents the "wavelength in extension" which is calculated on the basis of the sensor value of the second Doppler sensor 51B.

A "wavelength in extension" (LA) which is calculated on the basis of the sensor value of the first Doppler sensor 51A is an example of a "first length", and corresponds to information including both of the signal component according to the body motion of the user and the signal component according to the motion of the noise source NS.

In contrast, a "wavelength in extension" (LB) which is calculated on the basis of the sensor value of the second Doppler sensor 51B is an example of a "second length", and corresponds to information in which the signal component according to the motion of the noise source NS is dominant.

Therefore, the processor 41 subtracts the "wavelength in extension" LB from the "wavelength in extension" LA, and thus, is capable of cancelling or reducing the signal component according to the motion according to the noise source NS from the "wavelength in extension" LA (processing P13a of FIG. 11).

Furthermore, for example, the wavelength in extension LB which is subtracted from the wavelength in extension LA may be multiplied by a correction coefficient θ according to the motion of the noise source NS (processing P13b of FIG. 11). The motion of the noise source NS is a motion according to an operation state of the air conditioner 2. For example, it is considered that the vibration of the louver 23, which is an example of the noise source NS, increases as the blast volume per unit time of the air conditioner 2 increases.

For this reason, the wavelength in extension LB may be multiplied by a large correction coefficient θ as the blast volume increases. FIG. 16 illustrates an example of a relationship between the blast volume and the correction coefficient θ. The relationship exemplified in FIG. 16, for example, may be stored in advance in the memory 42 (refer to FIG. 6) as the database (DB). The correction coefficient θ may be represented as a function of the blast volume.

The blast volume of the air conditioner 2 is information which is capable of being grasped by the controller 21 to control the operation of the air conditioner 2 (refer to FIG. 5). For example, the controller 21 is capable of obtaining the blast volume per unit time on the basis of the control information of controlling the rotation of the blast fan 22.

The controller 21, for example, may transmit the information which represents the blast volume per unit time (or may be the control information of the blast fan 22) to the control system 4 along with the sensor information or individually, through the communication IF 24.

The processor 41 of the control system 4 is capable of identifying the blast volume per current unit time of the air conditioner 2 on the basis of the information received from the controller 21 of the air conditioner 2, and is capable of reading out the correction coefficient θ corresponding to the identified blast volume from the memory 42.

Furthermore, the correction coefficient θ may be alternatively or additionally stored in the memory 42 in association with a motion amount of the louver 23. In addition, the motion amount of the louver 23 may be associated with the control information that the controller 21 of the air conditioner 2 controls the motion of the louver 23.

Exemplarily, the processor 41 may calculate a body motion amount S of the user according to an operation represented by S=LA−LB×θ (processing P14 of FIG. 11).

The body motion amount S may be calculated as an operational result of the operation represented by S=LA−LB×θ for each unit time (for example, 1 second), or may be calculated as a value to which the operational result of S=LA−LB×θ to be obtained for each unit time is added over 1 minute to 2 minutes or the like.

Therefore, the unit of the body motion amount S may be represented as the number of times of the body motion ([number of times/second] or [number of times/minute]) detected for 1 second or for 1 minute. Furthermore, in FIG. 15, a point plotted by a mark of "▲" represents the "body motion amount".

The processor 41 may determine an activity state (or a sleep state) of the user on the basis of the "body motion amount" calculated as described above (processing P15 of FIG. 11).

For example, the "body motion amount" calculated by the processing P14 may include the body motion component according to the respiration or the heart beat of the user, and a body motion component according to a physical activity of the user. The processor 41 is capable of eliminating or reducing the body motion component according to the respiration or the heart beat of the user from the "body motion amount" by comparing the "body motion amount" with a first threshold value.

Figure 17A:
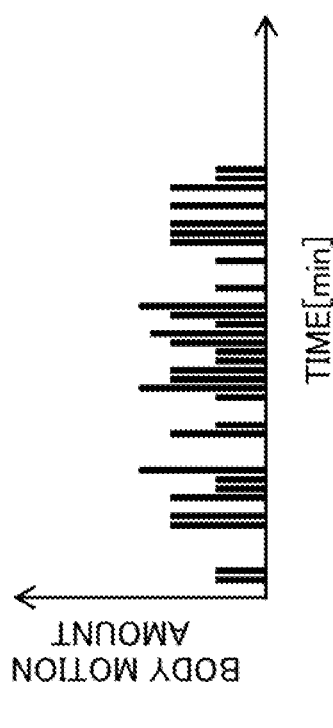
FIGS. 17A to 17D are diagrams for illustrating an example of sleep determination based on the body motion amount according to an embodiment.
Figure 17B:
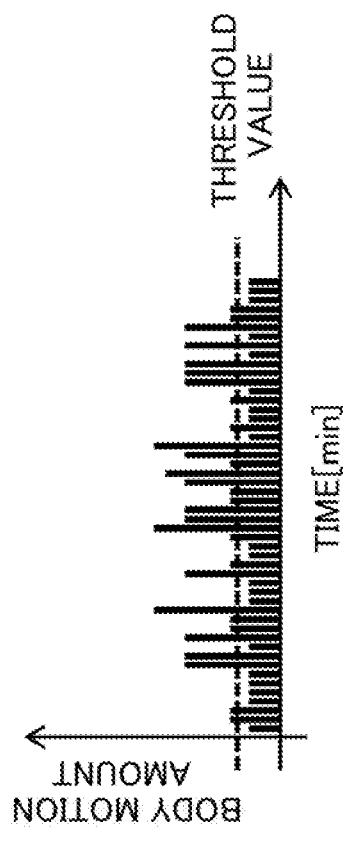

For example, as illustrated in FIG. 17A, the processor 41 may compare the "body motion amount" obtained over certain time with the first threshold value, and as illustrated in FIG. 17B, may obtain the "body motion amount" of greater than or equal to the first threshold value as the body motion amount according to the physical activity of the user. For this reason, the "first threshold value" may be conveniently referred to as a "respiration and heart beat component elimination threshold value".

Figure 17C:
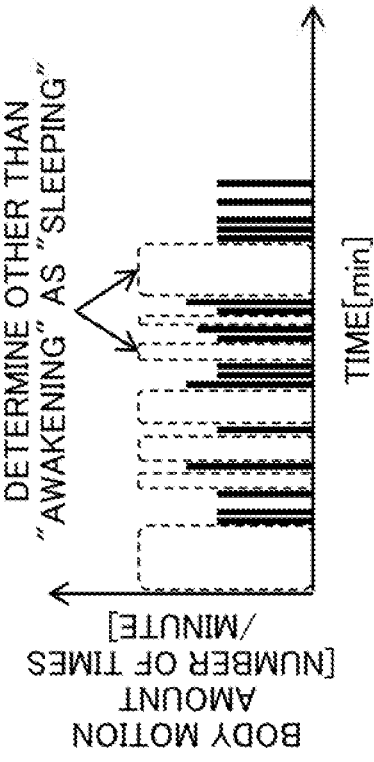

In addition, as exemplified in FIG. 17C, the processor 41 may determine time when the body motion amount is greater than or equal to a second threshold value as time when the user is in "awakening" by comparing the body motion amount according to the physical activity of the user with the second threshold value.

Figure 17D:
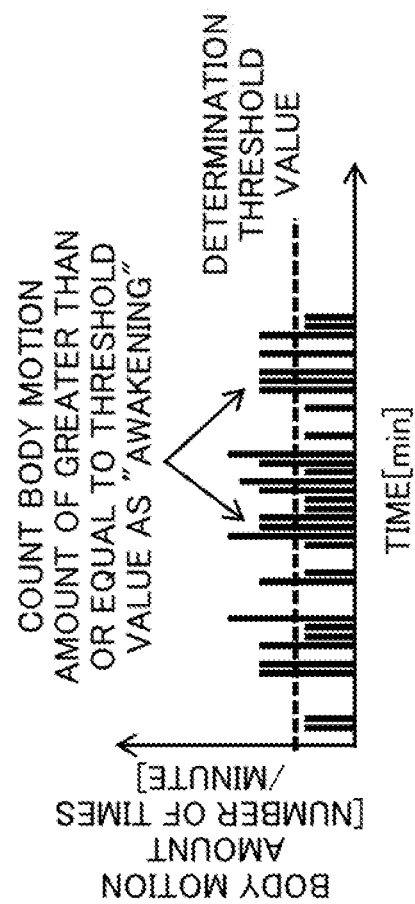

In other words, as exemplified in FIG. 17D, the processor 41 may determine that the user is in "sleeping" at time excluding the time determined as "awakening". For this reason, the "second threshold value" may be conveniently referred to as an "awakening/sleeping determination threshold value".

For example, in a case where the time determined as the "sleeping" is continuous over longer than or equal to threshold time such as several minutes, the processor 41 may determine that the user is in a "sleep state".

The processor 41 may control the driving of the air conditioner 2 on the basis of the determination result such as the "awakening" or the "sleeping" (processing P16 of FIG. 11). For example, the processor 41 may control the driving of the air conditioner 2 such that the air-conditioned space is set to a temperature or humidity which is suitable for each of the "sleeping" and the "awakening" of the user.

Furthermore, in FIG. 11, the body motion amount of the user is calculated on the basis of the "wavelength in extension" of each of the Doppler sensor values, but the body motion amount of the user may be calculated on the basis of each of the Doppler sensor values without calculating the "wavelength in extension".

Figure 18A:
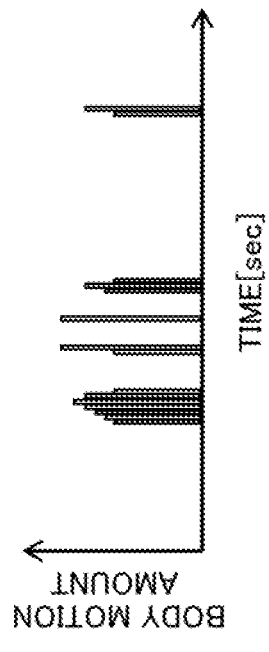
FIGS. 18A to 18D are diagrams for illustrating another example of the sleep determination based on the body motion amount according to an embodiment.

In other words, it is possible to delete or skip the calculate processing P12a and processing P12b of the "wavelength in extension" in FIG. 11. In a case where the "wavelength in extension" is not calculated, for example, as illustrated in FIG. 18A, in the processing P14, the processor 41 may compare the Doppler sensor value (the amplitude value) obtained by a difference operation in the processing P13a with the amplitude threshold value.

Figure 18B:
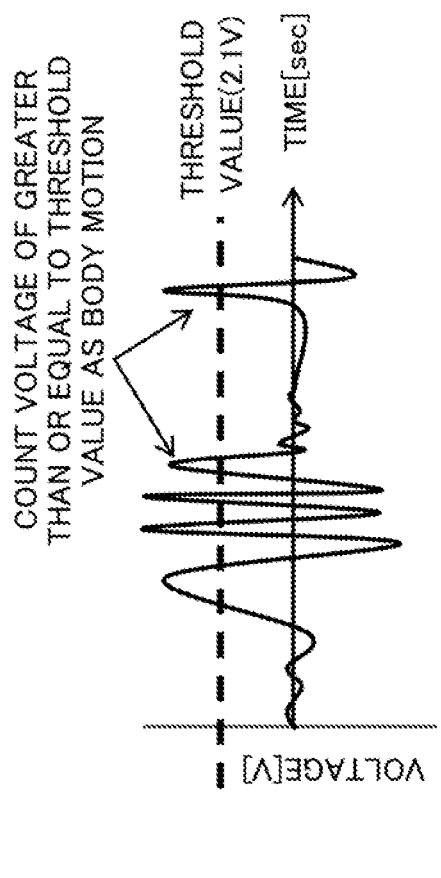

The processor 41, for example, may count a timing at which the Doppler sensor value is greater than or equal to the amplitude threshold value, in unit time such as time for 1 minute to 2 minutes, and as exemplified in FIG. 18B, may calculate the counted number of times as the body motion amount per unit time.

Figure 18C:
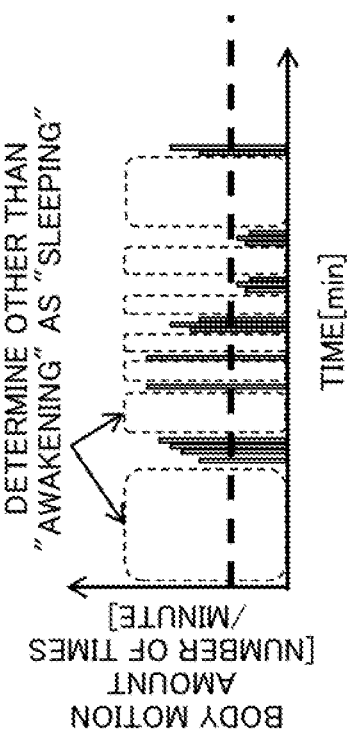

Then, as exemplified in FIG. 18C, in the processing P15, the processor 41 may compare the calculated body motion amount with the awakening/sleeping determination threshold value, and may determine time when the body motion amount is greater than or equal to the awakening/sleeping determination threshold value as time when the user is in the "awakening".

Figure 18D:
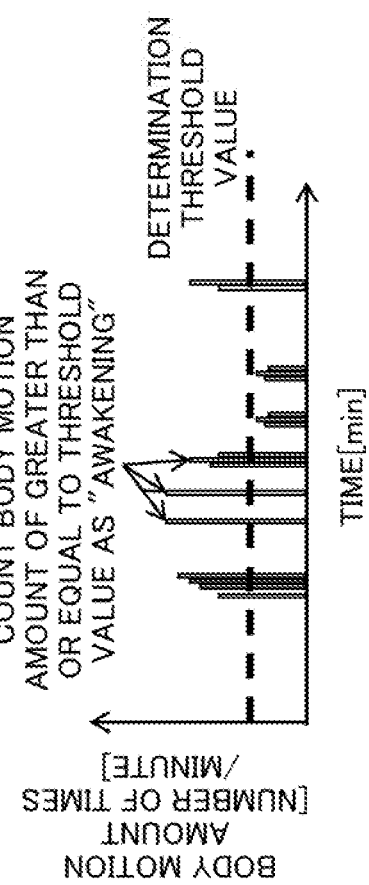

In other words, as exemplified in FIG. 18D, the processor 41 may determine the user is in the "sleeping" at time excluding the time determined as the "awakening". For example, in a case where the time determined as the "sleeping" is continuous over longer than or equal to threshold time such as several minutes, the processor 41 may determine that the user is in the "sleep state".

Furthermore, in the processing P13b of FIG. 11, in a case where the second Doppler sensor value is corrected but not the "wavelength in extension", there is a case where an error easily occurs compared to a case where the "wavelength in extension" is corrected.

For this reason, in a case where the "wavelength in extension" is calculated, it is possible to improve the calculation accuracy of the body motion amount. Therefore, it is also possible improve the determine accuracy of the activity state or the sleep state of the user, and to improve the accuracy or the efficiency of the driving control of the air conditioner 2 based on the determination described above.

In addition, in FIG. 11, on the basis of the determination result of the activity state or the sleep state of the user in the processing P15, the driving of the air conditioner 2 is controlled, but the processing P15 may be deleted or skipped. For example, the driving of the air conditioner 2 may be controlled on the basis of the "body motion amount" calculated in the processing P14.

As illustrated in FIG. 17B or FIG. 18B, the driving of the air conditioner 2 may be controlled such that the temperature of the air-conditioned space decreases at time when the body motion amount of greater than or equal to the threshold value is detected, as a non-attributive example.

Second Example

Figure 19:
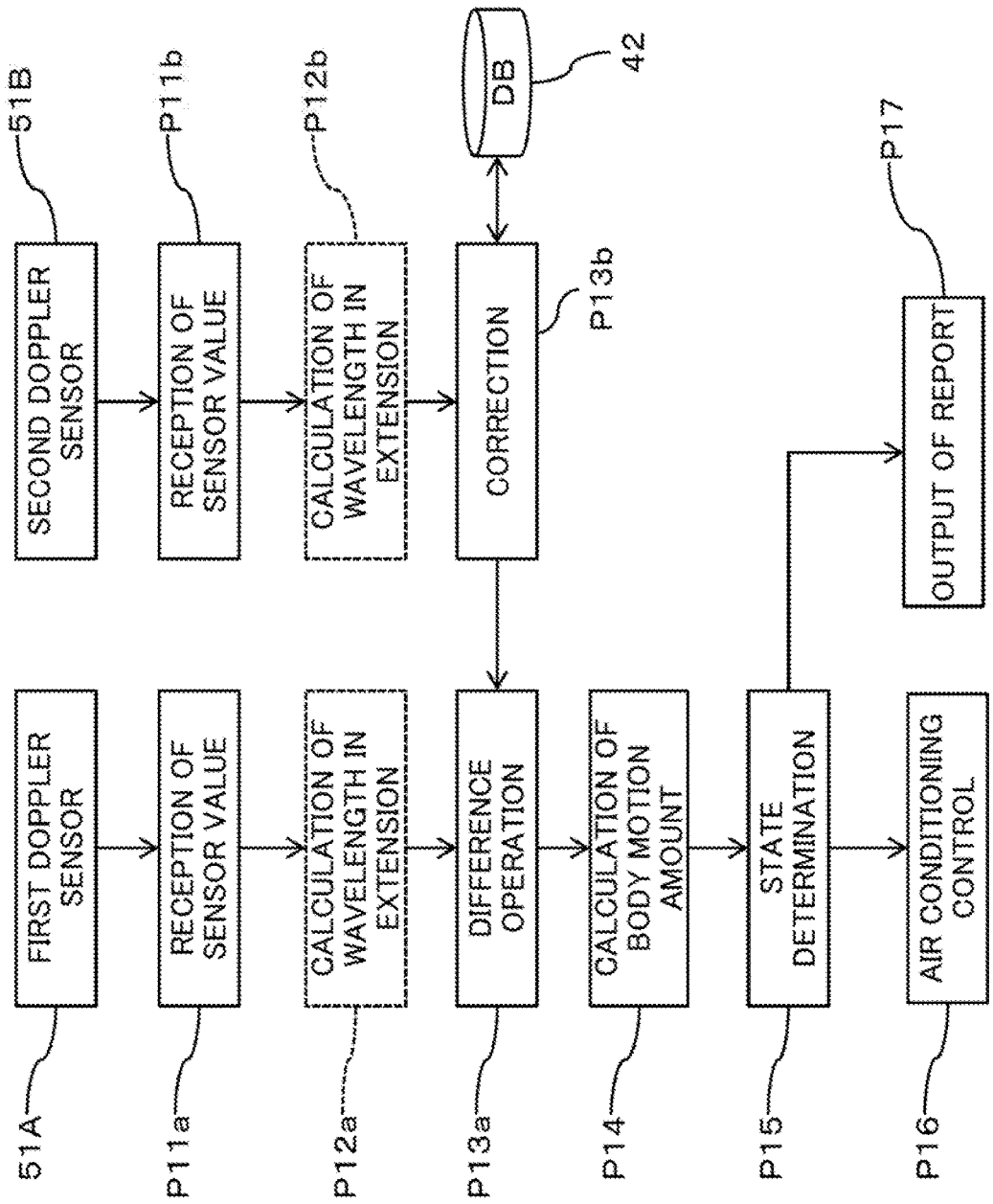
FIG. 19 is a flowchart for illustrating an operation example including noise canceling according to a second example of the air conditioning system exemplified in FIG. 1.

FIG. 19 is a flowchart illustrating the operation example of the air conditioning system 1 including noise canceling according to a second example.

The flowchart exemplified in FIG. 19 is different from the flowchart exemplified in FIG. 11 in that report output processing P17 is added.

In the report output processing P17, the processor 41 of the control system 4, for example, may output the determination result of the activity state or the sleep state of the user in the processing P15 to an external device as report data.

Exemplarily, the external device, which is an output destination of the report data may be an output device such as a display or a printer, which is connected to the peripheral IF 45 (refer to FIG. 6), or may be the storage device 43. The external device may be alternatively or additionally an information terminal which is possessed by the user or the security company described above.

It is possible to grasp and manage a health state or the like of the user, with reference to the report data.

Third Example

Figure 20:
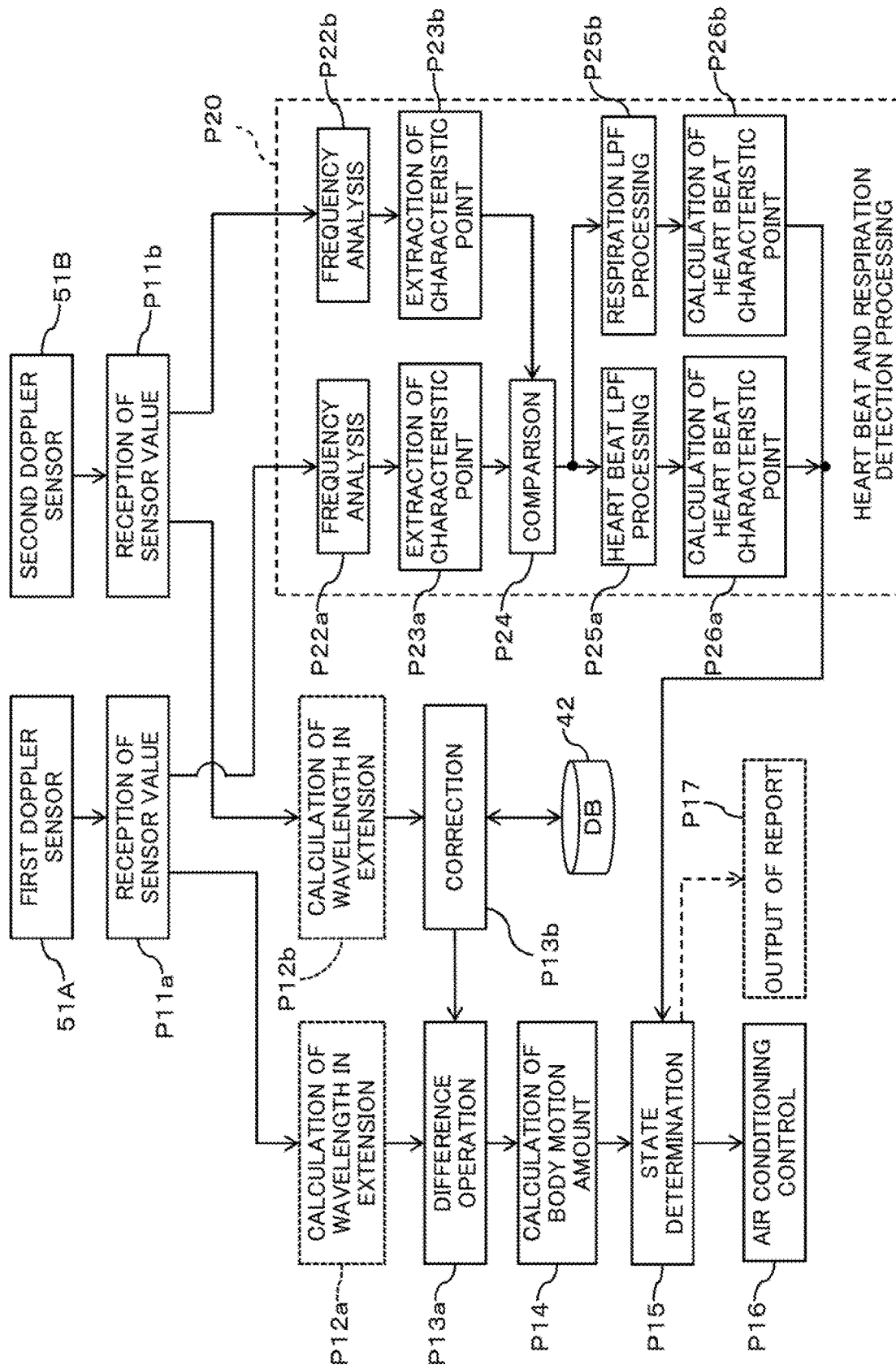
FIG. 20 is a flowchart for illustrating an operation example including noise canceling according to a third example of the air conditioning system exemplified in FIG. 1.

FIG. 20 is a flowchart illustrating the operation example of the air conditioning system 1 including noise canceling according to a third example. The flowchart exemplified in FIG. 20 is different from the flowchart exemplified in FIG. 11 of the first example in that heart beat and respiration detection processing P20 is added.

The heart beat and respiration detection processing P20, for example, may be executed in parallel with the processing of the flowchart exemplified in FIG. 11, according to the processor 41 of the control system 4.

In the heart beat and respiration detection processing P20, the processor 41 may perform frequency analysis with respect to each of the Doppler sensor values according to the reception of the first Doppler sensor value and the second Doppler sensor value (P11a and P11b) (processing P22a and processing P22b). Fast fourier transform (FFT) may be applied to the frequency analysis. Furthermore, the "FFT" may be substituted with "discrete fourier transform (DFT)" (the same applies to the followings).

For example, each of the Doppler sensor values may be converted to a signal in a frequency region (may be conveniently referred to as a "frequency signal") from the signal in the time region by the FFT.

The processor 41 may detect (may be referred to as "extract") a frequency component (may be conveniently referred to as an "FFT peak frequency") which represents a change relatively larger than others, from the frequency signals of each of the Doppler sensor values (processing P23a and processing P23b). The FFT peak frequency of the Doppler sensor value is an example of a frequency component which represents a characteristic change according to the heart beat or the respiration, and may be conveniently referred to as a "characteristic point".

The processor 41 may perform comparison processing with respect to the extracted "characteristic point" (processing P24). Exemplarily, the "comparison processing of the characteristic point" may be comparison processing of the "characteristic point" obtained from each of the first Doppler sensor value and the second Doppler sensor value.

In the "comparison processing", for example, it is possible to exclude information which represents a characteristic change according to the motion of the noise source NS from candidates of information which represents the characteristic change according to the heart beat or the respiration. Therefore, the "comparison processing" may be conveniently referred to as "filtering".

In other words, the processor 41 is capable of specifying one or a plurality of characteristic points among a plurality of characteristic points represented in a frequency analysis result of the first Doppler sensor value, on the basis of a frequency analysis result of the second Doppler sensor value.

Figure 21:
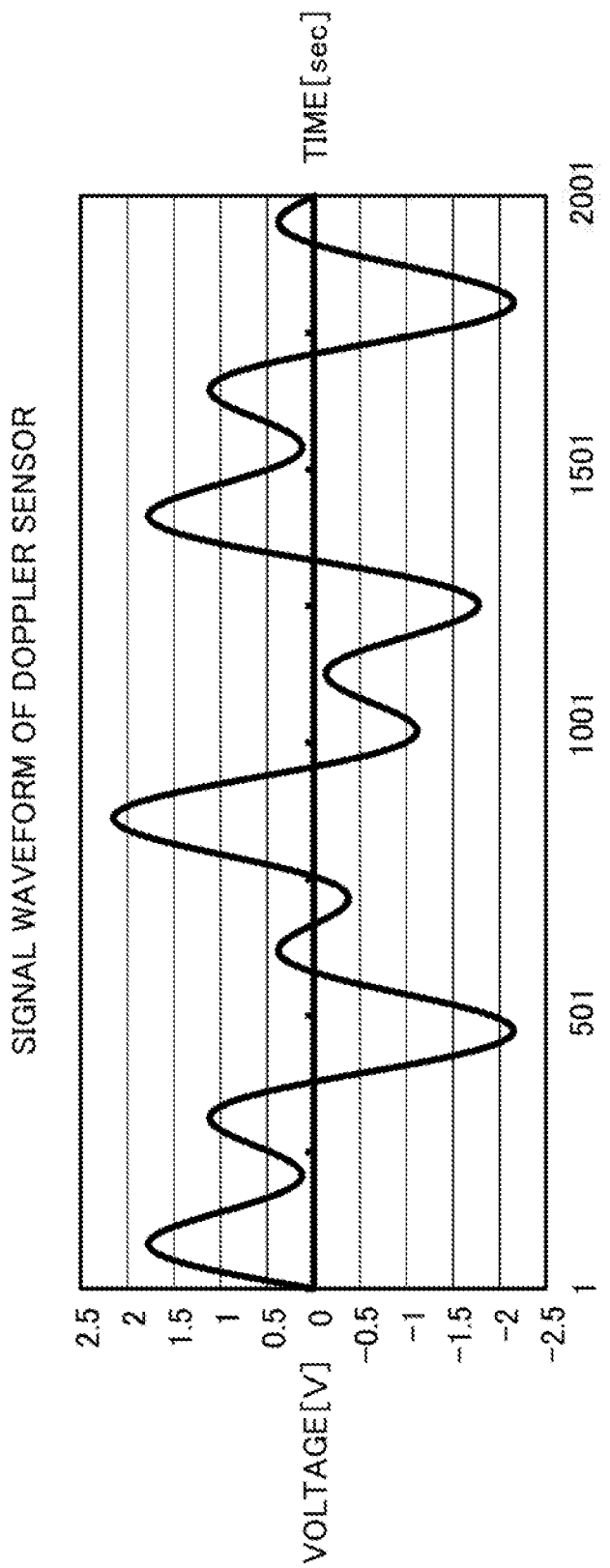
FIG. 21 is a diagram illustrating an example of a detection signal of the Doppler sensor according to an embodiment.
Figure 22:
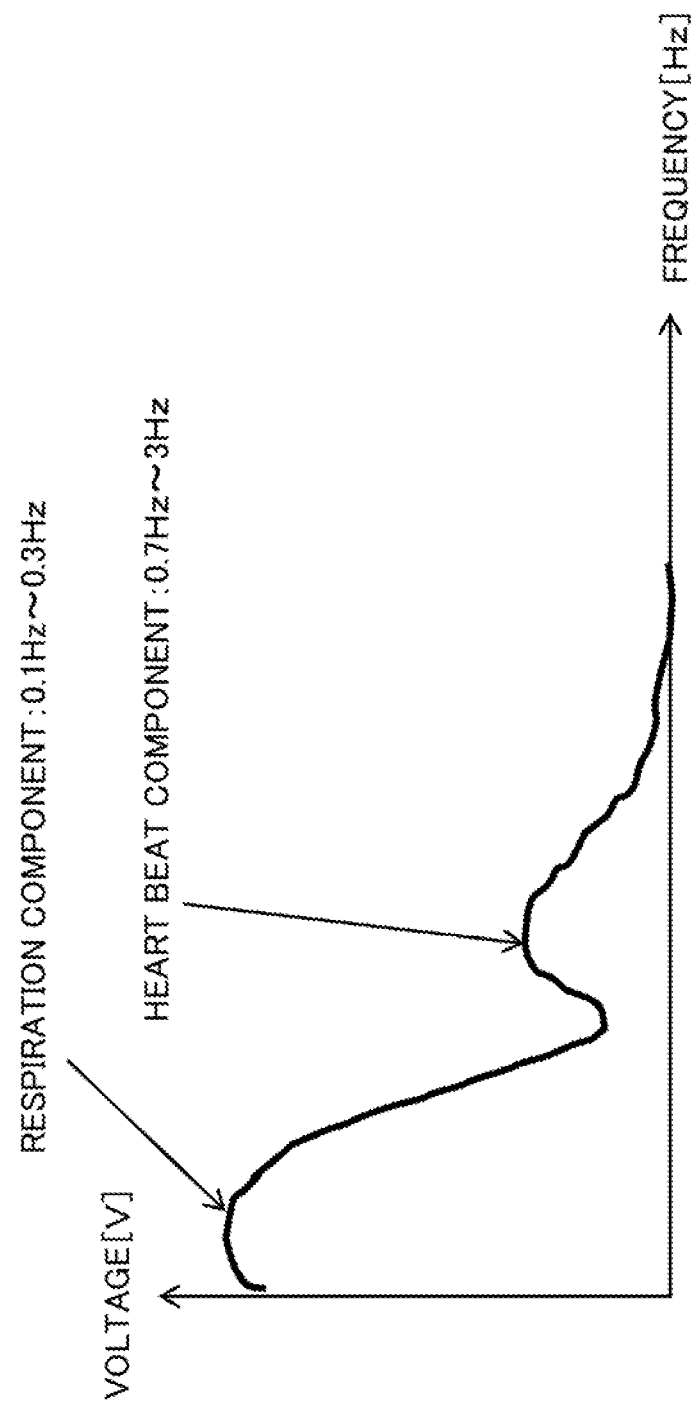
FIG. 22 is a diagram illustrating an example of a frequency analysis result of the detection signal of the Doppler sensor exemplified in FIG. 21.

FIG. 21 illustrates an example of a time change in the first Doppler sensor value, and FIG. 22 illustrates an example of an FFT result of the first Doppler sensor value exemplified in FIG. 21.

As exemplified in FIG. 22, in the FFT result of the first Doppler sensor value, a peak frequency corresponding to a respiratory component on a low frequency side is generated, and a peak frequency corresponding to a heart beat component on a high frequency side is generated.

As a non-attributive example, in the FFT result of the first Doppler sensor value, the peak frequency of the heart beat component of the human body tends to be generated in a frequency range of approximately 0.7 Hz to 3 Hz. In addition, in the FFT result of the first Doppler sensor value, the peak frequency of the respiratory component of the human body tends to be generated in a frequency range of approximately 0.1 Hz to 0.3 Hz.

Therefore, in such frequency ranges, the processor 41 may compare the FFT peak frequency of the first Doppler sensor value with the FFT peak frequency of the second Doppler sensor value.

As the result of the comparison, the processor 41 may determine that a frequency component that the FFT peak frequency is coincident with is a noise component according to the motion of the noise source NS but not the change according to the heart beat or the respiration. According to the determination described above, the processor 41 may delete the noise component from the FFT result of the first Doppler sensor value.

A non-attributive example of the comparison processing in the processing P24 will be described with reference to FIG. 23A and FIG. 23B.

FIG. 23A illustrates an example of the frequency analysis result of the first Doppler sensor value, and FIG. 23B illustrates an example of the frequency analysis result of the second Doppler sensor value.

In FIG. 23A, frequencies respectively represented by reference numerals a1 to a5 represent the FFT peak frequency which is an example of the "characteristic point" with respect to the first Doppler sensor value, and for example, are obtained by the characteristic point extract processing P23a described above. Furthermore, exemplarily, $a1<a2<a3<a4<a5$ is satisfied.

Similarly, in FIG. 23B, frequencies respectively represented by reference numerals b1 to b3 represent the FFT peak frequency which is an example of the "characteristic point" with respect to the second Doppler sensor value, and for example, are obtained by the characteristic point extract processing P23b described above. Furthermore, exemplarily, $b1<b2<b3$ is satisfied.

In the comparison processing P24, for example, the "characteristic point" obtained with respect to the first Doppler sensor value is compared with the "characteristic point" obtained with respect to the second Doppler sensor value. In a case where a set of the characteristic points a1 to a5 is represented as "A", and a set of the characteristic points b1 to b3 is represented as "B", in the comparison processing P24, a characteristic point which is included in the set A but is not included in the set B (in other words, satisfies a relationship of "A¥B") is obtained.

In the examples of FIG. 23A and FIG. 23B, in case where it is assumed that a3=b1, a4=b2, and a5=b3, the characteristic points a1 and a2 with respect to the first Doppler sensor value are the candidates.

The processor 41 may perform bandpass filtering (BPF) processing with respect to an original signal waveform of the first Doppler sensor value (for example, refer to FIG. 21) on the basis of a candidate characteristic point (in other words, a frequency) which narrows as described above.

Figure 24:
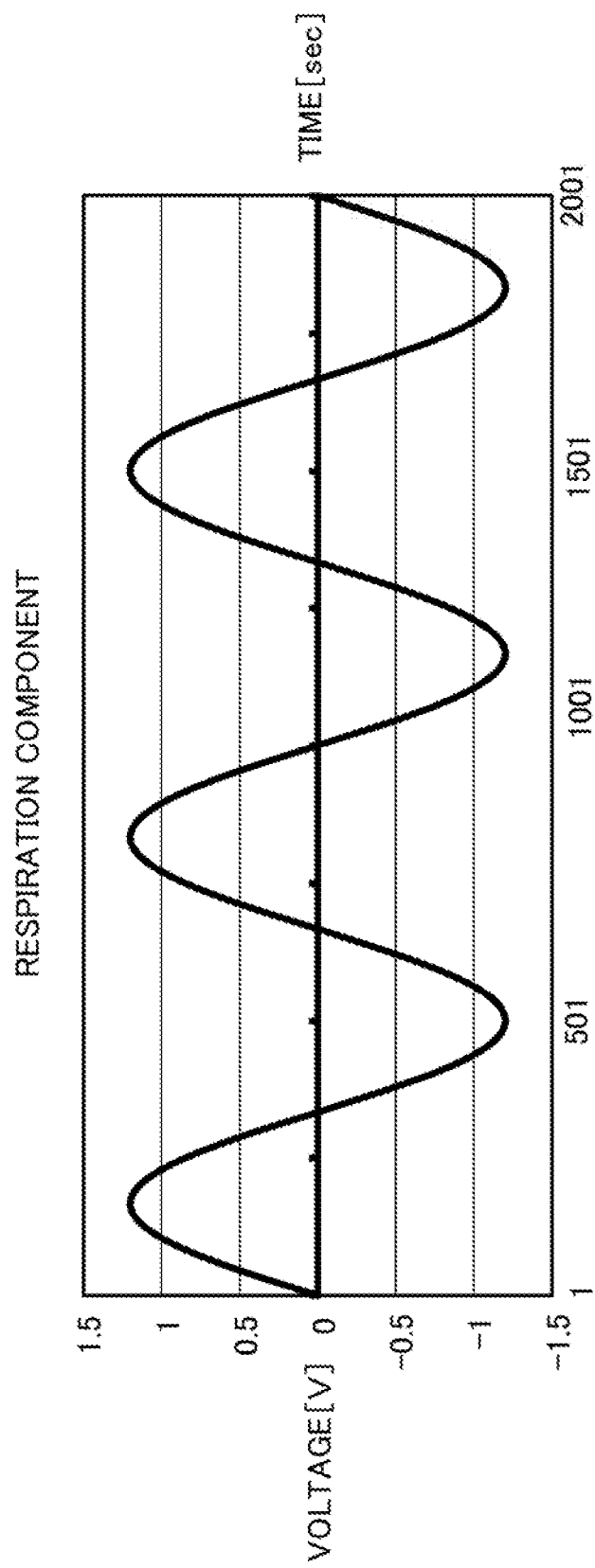
FIG. 24 is a diagram illustrating an example of a signal waveform corresponding to a respiratory component separated from a signal waveform of a Doppler sensor value exemplified in FIG. 21.
Figure 25:
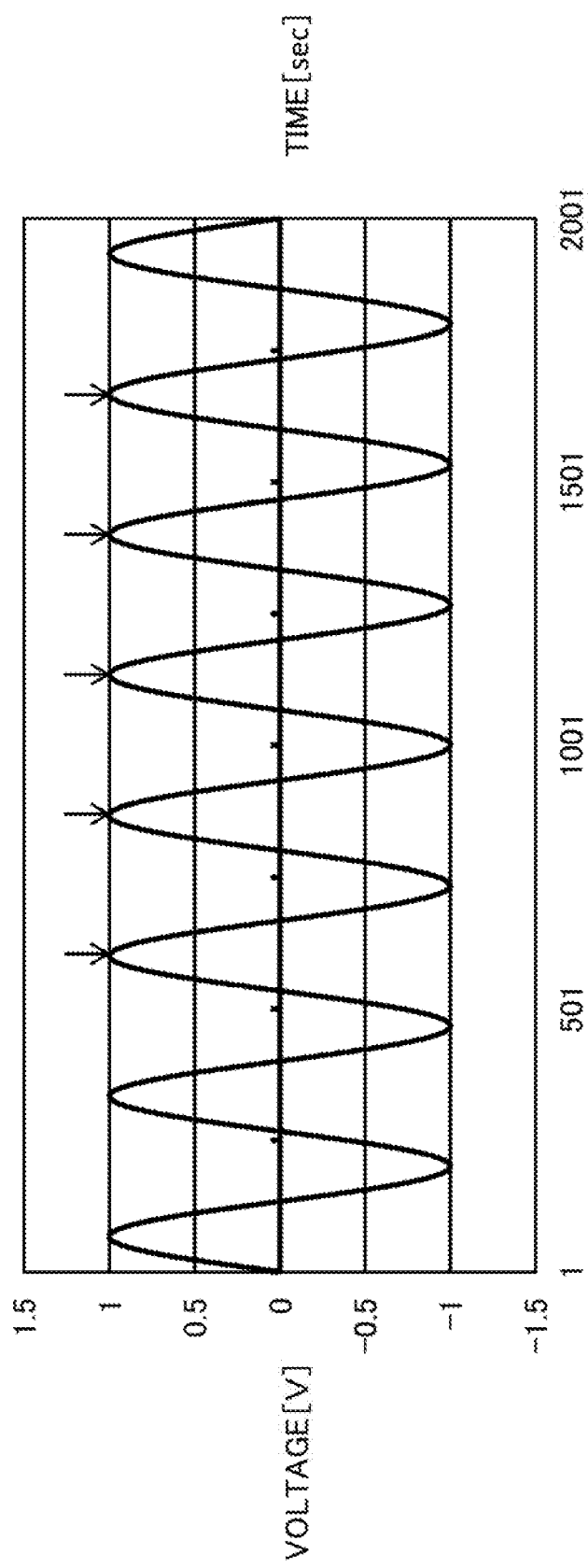
FIG. 25 is a diagram illustrating an example of a signal waveform corresponding to heart beat component separated from the signal waveform of the Doppler sensor value exemplified in FIG. 21.

Accordingly, for example, as exemplified in FIG. 24 and FIG. 25, it is possible to separate the signal waveform corresponding to the respiratory component and the signal waveform corresponding to the heart beat component from the original signal waveform of the of the first Doppler sensor value (refer to FIG. 21).

The processor 41 may suitably perform lowpass filtering (LPF) for eliminating the noise component with respect to each of the separated signal waveforms (processing P25a and processing P25b of FIG. 20).

The processor 41 is capable of calculating the heart rate or the respiration rate from the obtained signal waveforms. For example, in a case of the heart rate, the processor 41 may identify a characteristic point of the signal waveform corresponding to the heart beat component (for example, the peak of the amplitude) exemplified in FIG. 25, and may obtain a time interval of the characteristic points (for example, "second").

The processor 41, for example, is capable of calculating a heart rate per 1 minute by dividing 1 minute (=60 seconds) by the obtained time interval (processing P26a of FIG. 20). Similarly, the processor 41 is capable of calculating the respiration rate (processing P26b of FIG. 20).

The processor 41 is capable of determining the sleep state of the user in the processing P15 of FIG. 20, on the basis of the heart rate and the respiration rate calculated as described above, and the body motion amount calculated in the processing P14.

For example, not only is it possible to determine whether or not the user is sleeping, but also it is possible to determine whether the sleep state "REM sleep" or "non-REM sleep".

Exemplarily, a sleep period (or a step) of the user is capable of being classified to stages 1 to 5. The stage 1 is referred to as an "initial sleep period", the stage 2 is referred to as a "light sleep period", the stage 3 is referred to as a "moderate sleep period", and the stage 4 is referred to as a "deep sleep period". The stages 1 to 4 are referred to as the "non-REM sleep", and the stage 5 is referred to as the "REM sleep".

Exemplarily, the processor 41 is capable of determining the "non-REM sleep" of the stages 3 and 4 and the "REM sleep" of the stage 5, on the basis of the heart rate, the respiration rate, and the body motion amount of the user.

For example, as illustrated in FIG. 26, in the "REM sleep", a level is represented in which it may be determined that the heart rate increases and is irregularly changed, the respiration rate tends to increase, and there is no or substantially no body motion amount.

In contrast, in the "non-REM sleep", a level is represented in which it may be determined that the heart rate decreases, the respiration rate decreases and tends to be stable, and there is no or substantially no body motion amount.

Hereinafter, an example of the sleep determination based on the heart beat will be described. In a case where the heart rate (or the respiration rate) is expressed by x1, x2, ..., xN, an arithmetic average (a population mean) m thereof is capable of being represented by Expression 4 described below.

$$m = \frac{1}{N}\sum_{i=1}^{N} x_i$$ [Expression 4]

An amount (σ2) obtained by Expression 5 described below with the arithmetic average (the population mean) m is defined as a variance (or a population variance).

$$\sigma^2 = \frac{1}{N}\sum_{i=1}^{N} (x_i - m)^2$$ [Expression 5]

A positive square root σ of the variance σ2 is defined as a standard deviation of a parent population. In a case where a condition of "the standard deviation σ is greater than or equal to a threshold value and the heart rate is greater than or equal to a threshold value" is satisfied, the processor 41 may determine that it is the "REM sleep", and in a case where the condition is not satisfied, the processor 41 may determine that it is the "non-REM sleep".

Figure 27:
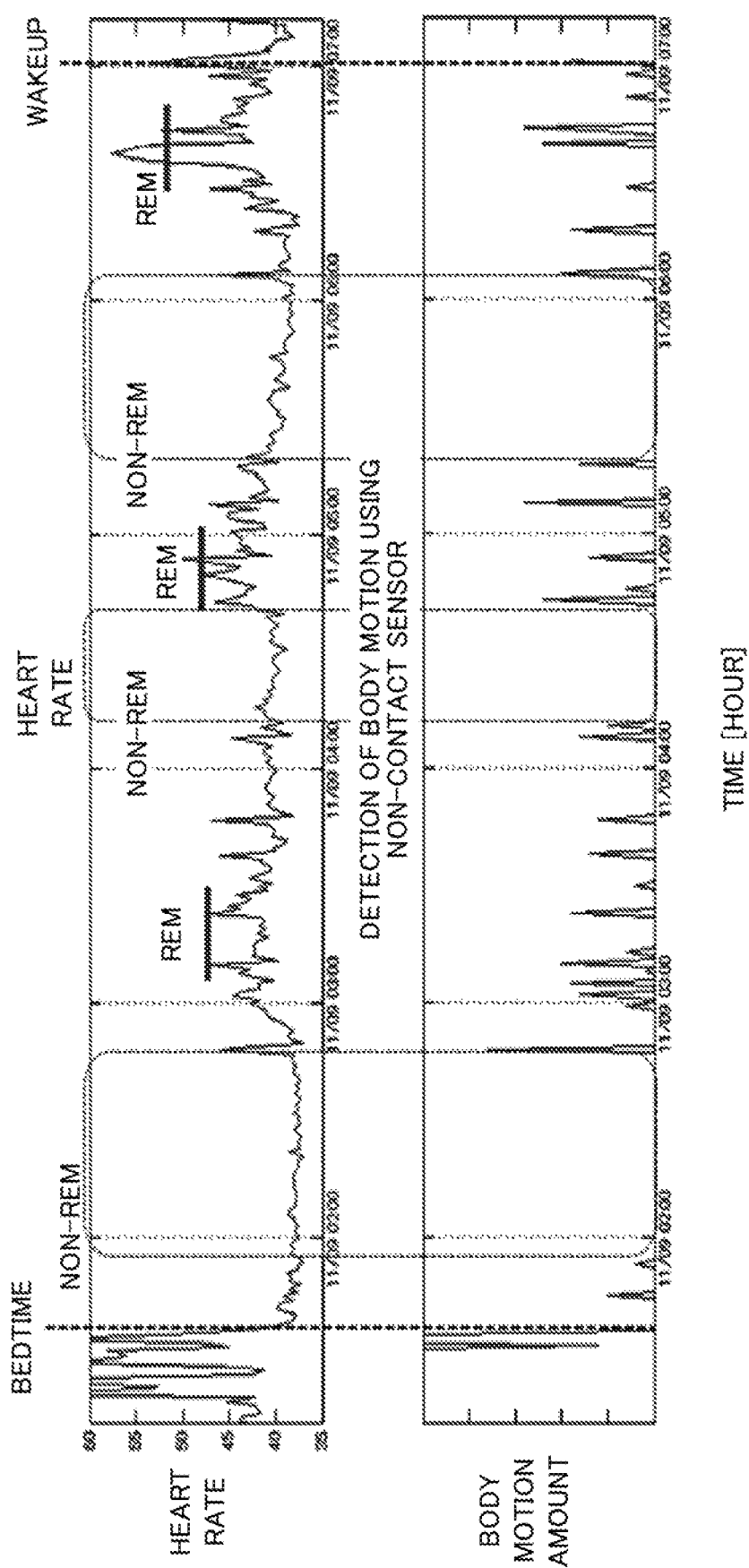
FIG. 27 is a diagram illustrating an example of a time change in the heart rate and the body motion amount from bedtime to wakeup of a user according to the third example.

FIG. 27 illustrates an example of a time change in the heart rate and the body motion amount from bedtime to wakeup of the user. Furthermore, in FIG. 27, it is assumed that the respiration rate has the same change as that in the conveniently heart rate, the time change of the respiration rate is not illustrated.

In a case where the relationship exemplified in FIG. 26 is applied to the time change in the heart rate and the body motion amount exemplified in FIG. 27, it is possible to determine that the non-REM sleep and the REM sleep alternately occur three times each, from the bedtime to the wakeup.

A non-attributive numerical example is illustrated in FIG. 28 and FIG. 29. As exemplified in FIG. 28, it may be determined as the "REM sleep" in a level where it may be determined that the heart rate is greater than or equal to 45 and the standard deviation is greater than or equal to 2, the standard deviation of the respiration rate is greater than or equal to 1.5, and there is no or substantially no body motion amount.

On the other hand, it may be determined as the "non-REM sleep" in a level where it may be determined that the heart rate is less than 45 and the standard deviation is less than 2, the standard deviation of the respiration rate is less than 1.5, and there is no or substantially no body motion amount.

According to heart rate data exemplified in FIG. 29, an average of heart rates [beats per minute, bpm] in a first column is "37.3", and a standard deviation is "1.62", and thus, time when the heart rate data of the first column is a candidate which may be determined as the "non-REM sleep".

On the other hand, an average of heart rates in a second column of FIG. 29 is "46.9", and a standard deviation is "2.34", and thus, time when the heart rate data of the second column is obtained is a candidate which may be determined as the "REM sleep".

The processor 41 may perform air conditioning control which is suitable for the determination result of the "non-REM sleep" and the "REM sleep" as described above (the processing P16 of FIG. 20).

For example, the processor 41 may control the driving of the air conditioner 2 such that the temperature of the air-conditioned space gradually decreases at the time determined as the "non-REM sleep". According to the control, it is possible to accelerate the introduction of the user into the "deep sleep period" (the stage 4).

In addition, the processor 41 may control the driving of the air conditioner 2 such that the temperature of the air-conditioned space gradually increases at the time determined as the "REM sleep". There are many cases where the "awakening" of the user occurs after the "REM sleep", and thus, it is possible to introduce the user into comfortable "awakening" by gradually increasing the temperature of the air-conditioned space at the time determined as the "REM sleep". In addition, it is also possible to prevent the user from receiving a heat shock at the "awakening".

Furthermore, weighting may be performed in the parameters used for the determination of the sleep state (exemplarily, the heart rate, the respiration rate, and the body motion amount) in the processing P15 described above.

For example, in a case where the body motion amount is less than the threshold value, the processor 41 may increase the weighting on the heart rate and the respiration rate, and thus, may increase the determination sensitivity of the "REM sleep" and the "non-REM sleep".

In contrast, in a case where the body motion amount is greater than or equal to the threshold value, the processor 41 may increase the weighting on the body motion amount, and thus, may increase the determination sensitivity of whether the user is sleeping or is active.

In addition, in the third example, the processor 41 may output the determination result in processing P15 to an external device as the report, as with the second example (the processing P17 of FIG. 19).

Fourth Example

Figure 30:
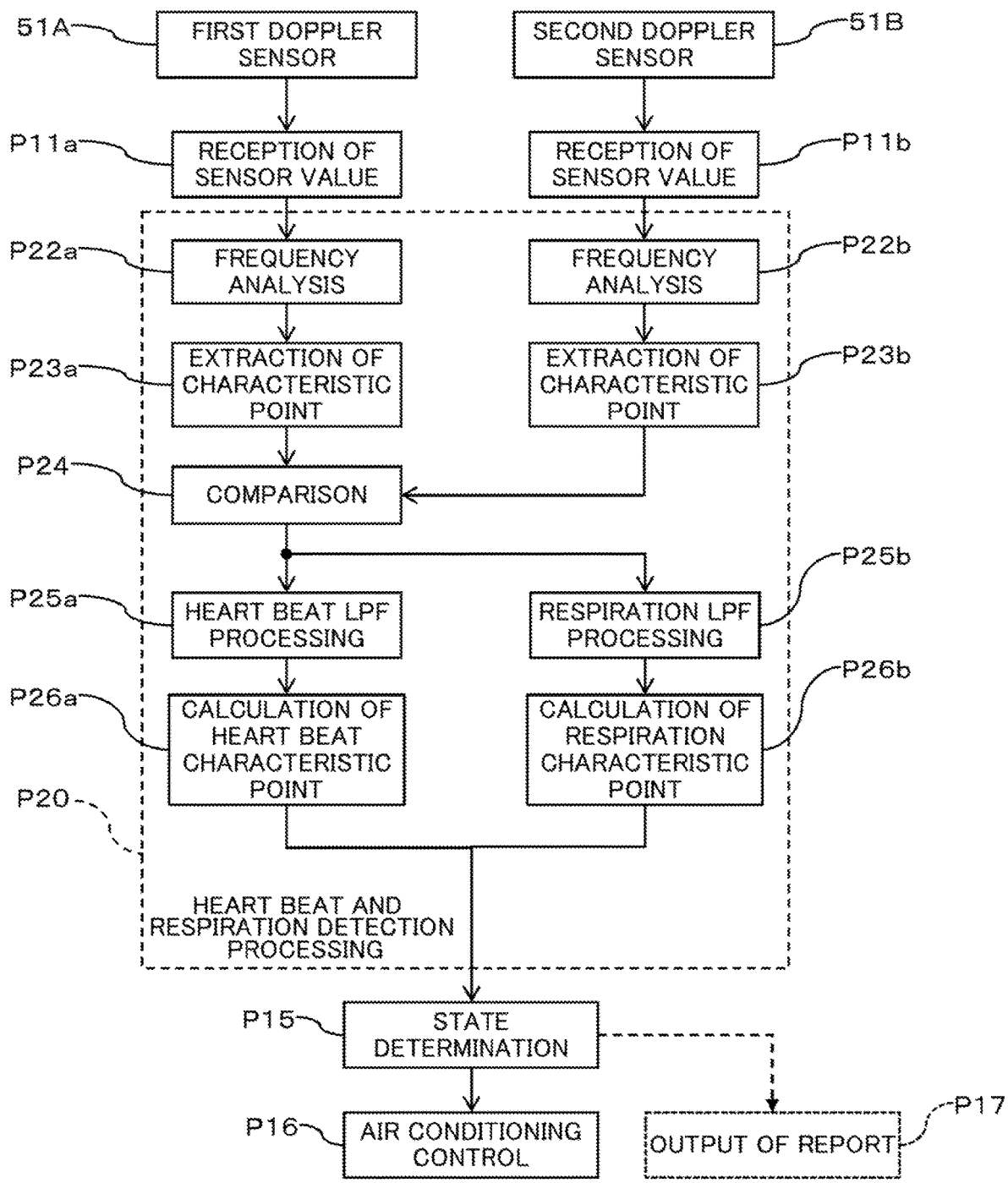
FIG. 30 is a flowchart for illustrating an operation example including noise canceling according to a fourth example of the air conditioning system exemplified in FIG. 1.

FIG. 30 is a flowchart illustrating the operation example of the air conditioning system 1 including noise canceling according to a fourth example.

The flowchart exemplified in FIG. 30 is different from the flowchart exemplified in FIG. 20 of the third example in that the processing relevant to the calculation of the body motion amount (P12a, P12b, P13a, P13b, and P14) is deleted. Alternatively, the flowchart exemplified in FIG. 30 may be regarded as representing an operation example from which the processing relevant to the calculation of the body motion of the third example is skipped.

Therefore, the processor 41 may perform air conditioning control by determining the sleep state of the user, on the basis of the heart rate and the respiration rate which are calculated by the heart beat and respiration detection processing P20 described in the third example (processing P15 and processing P16 of FIG. 30).

The fourth example, for example, is effective for setting the user who may be considered to take a rest for relatively long time and to have a small body motion amount, such as a patient under a medical treatment or a person in need of nursing care, an aged person, and a baby, to the sensing target of the sensor 5.

For example, the processor 41 is capable of realizing the air conditioning control suitable for the user who is in a stable state in the air-conditioned space, on the basis of the determination result of the sleep state of the user.

Furthermore, as with the second example and the third example (the processing P17 of FIG. 19 and FIG. 20), in the fourth example, the processor 41 may output the determination result in the processing P15 to the external device as the report.

As described above, according to the embodiment including each of the examples described above, the non-contact vital sensor 5 is built in the air conditioner 2, and thus, it is possible to detect the state of the user in the air-conditioned space, and to automatically perform the air conditioning control according to the state of the user. Therefore, for example, it is possible to continue the good sleep of the user or to perform "watching" of the user without allowing the user to aware the "watching".

Furthermore, in the embodiment including each of the examples described above, an aspect has been described in which the processing exemplified in FIG. 11 to FIG. 30 is performed by the processor 41 of the control system 4 as a non-attributive example.

However, as described above, a part or all of the processing exemplified in FIG. 11 to FIG. 30 may be performed by the controller 21 of the air conditioner 2.

Exemplarily, the controller 21 may transmit a calculation value which is calculated in a processing process up to the state determination of the user on the basis of the Doppler sensor value to the control system 4, and the control system 4 may execute the remaining processing process up to the state determination of the user on the basis of the received calculation value.

In a case where all of the processing exemplified in FIG. 11 to FIG. 30 are performed by the controller 21 of the air conditioner 2, the control system 4 may be unnecessary. In addition, the relationship between the blast volume and the correction coefficient θ, exemplified in FIG. 16, may be stored in the memory 212 of the controller 21 (refer to FIG. 4).

In a case where all of the processing exemplified in FIG. 11 to FIG. 30 are performed by the controller 21 of the air conditioner 2, it is possible to realize suitable air conditioning control according to the state of the user in the air-conditioned space insofar as the air conditioner 2, in which the Doppler sensors 51A and 51B described above are built in air-conditioned space, is disposed.

On the other hand, according to an aspect of performing calculation processing or correction processing, and state determination processing in the control system 4, for example, it is possible to easily add or update the function of the control system 4 by modifying the program or the data which is read and operated by the processor 41 of the control system 4.

Therefore, it is possible to easily and one-dimensionally update the air conditioning system 1 according to the modification of the control system 4, without modifying the non-contact vital sensor 5.

In addition, in the embodiment including each of the examples described above, the determination of the state of the user in the air-conditioned space has been described, but determination of whether or not the user is in the air-conditioned space may be performed on the basis of the Doppler sensor value. The air conditioner 2 or the control system 4 may adaptively control the driving of the air conditioner 2, according to the presence or absence of the user.

As one aspect, It is possible to improve a detection accuracy of biological information by a Doppler sensor built in an air conditioner.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An air conditioner, comprising:
a first Doppler sensor that transmits a first electric wave of first power;
a second Doppler sensor that transmits a second electric wave of second power less than the first power; and
a controller that controls an operation of the air conditioner on the basis of a detection signal of the first Doppler sensor and a detection signal of the second Doppler sensor, wherein
the first power is such that the first electric wave is capable of reaching a movable portion of the air conditioner and a living body being positioned in an air conditioned space of the air conditioner,
the second power is such that the second electric wave is capable of reaching the movable portion and incapable of reaching the living body, and
the movable portion is a louver provided in the air conditioner.

2. The air conditioner according to claim 1, wherein the controller is configured to correct the detection signal of the first Doppler sensor according to the detection signal of the second Doppler sensor, and controls the operation of the air conditioner on the basis of the corrected detection signal of the first Doppler sensor.

3. The air conditioner according to claim 1, wherein the controller is configured to:
calculate a first length corresponding to a trajectory drawn by a change in the detection signal of the first Doppler sensor in a time region per unit time, and a second length corresponding to a trajectory drawn by a change in the detection signal of the second Doppler sensor in a time region per unit time,
correct the first length according to the second length, and control the operation of the air conditioner on the basis of the corrected first length.

4. The air conditioner according to claim 3, wherein the controller is further configured to reduce the second length which is corrected by a correction coefficient set in advance according to an operation state of the air conditioner from the first length
the first length is corrected according to the reduced second length.

5. The air conditioner according to claim 1, wherein the controller is configured to:

specify one or a plurality of characteristic points among a plurality of characteristic points represented in a frequency analysis result of the detection signal of the first Doppler sensor on the basis of a frequency analysis result of the detection signal of the second Doppler sensor, and control the operation of the air conditioner on the basis of the one or the plurality of specified characteristic points.

6. The air conditioner according to claim 2, wherein the controller is configured to:

specify one or a plurality of characteristic points among a plurality of characteristic points represented in a frequency analysis result of the detection signal of the first Doppler sensor on the basis of a frequency analysis result of the detection signal of the second Doppler sensor, and control the operation of the air conditioner on the basis of the one or the plurality of specified characteristic points and a result of the correcting.

7. The air conditioner according to claim 1, wherein the first electric wave is capable of reaching a living body being positioned in an air conditioned space of the air conditioner, and the controller is configured to determine a state of the living body on the basis of the detection signal of the first Doppler sensor and the detection signal of the second Doppler sensor, and the operation of the air conditioner is controlled using a result of the determining.

8. The air conditioner according to claim 7, wherein the state of the living body is determined by calculating a body motion amount of the living body on the basis of the detection signal of the first Doppler sensor and the detection signal of the second Doppler sensor, calculating a heart rate or a respiration rate of the living body on the basis of one or a plurality of characteristic points specified on the basis of a frequency analysis result of the detection signal of the second Doppler sensor among a plurality of characteristic points represented in a frequency analysis result of the detection signal of the first Doppler sensor, and determining a sleep state of the living body on the basis of the body motion amount, and the heart rate or the respiration rate.

9. The air conditioner according to claim 7, wherein the controller is configured to output a determination result of the state of the living body to an external device.

10. An air conditioner, comprising:

a first Doppler sensor that transmits a first electric wave of first power;

a second Doppler sensor that transmits a second electric wave of second power less than the first power; and a controller that controls an operation of the air conditioner based on a first detection signal of the first Doppler sensor and a second detection signal of the second Doppler sensor, wherein the first Doppler sensor is disposed in a first position in which the air conditioned space is observed by the first electric wave through a movable portion of the air conditioner in an internal space between a housing of the air conditioner on an air-conditioned space side and a heat exchanger provided in the air conditioner, the second Doppler sensor is disposed in a second position in which the movable portion is observed by the second electric wave in the internal space, the movable portion is a louver which is provided in the air conditioner, and each of the first position and the second position is a position facing the louver in the internal space.

11. The air conditioner according to claim 10, wherein the first Doppler sensor and the second Doppler sensor are included in a sensor unit disposed in the position facing the louver includes.

12. A sensor unit built in an air conditioner, comprising:

a first Doppler sensor that sets an air conditioned space of the air conditioner as a sensing target; and a second Doppler sensor that sets a movable portion according to an operation of the air conditioner as a sensing target, wherein the first Doppler sensor is disposed in a first position in which the air conditioned space is observed by the first electric wave through a movable portion according to the operation of the air conditioner in an internal space between a housing of the air conditioner on an air conditioned space side and a heat exchanger provided in the air conditioner, the second Doppler sensor is disposed in a second position in which the movable portion is observed by the second electric wave in the internal space, the movable portion is a louver which is provided in the air conditioner, and each of the first position and the second position is a position facing the louver in the internal space.

13. The sensor unit according to claim 12, wherein the operation of the air conditioner is controlled on the basis of information of a living body in the air conditioned space, which is detected on the basis of a detection signal of each of the Doppler sensors.

14. A control system of an air conditioner, comprising:

a receiver that receives a detection signal of each of a first Doppler sensor which is provided in the air conditioner and transmits a first electric wave of first power, and a second Doppler sensor which is provided in the air conditioner and transmits a second electric wave of second power less than the first power; and a transmitter that transmits a signal to control an operation of the air conditioner, which is generated on the basis of the detection signal of the first Doppler sensor and the detection signal of the second Doppler sensor, to the air conditioner, wherein the first power is such that the first electric wave is capable of reaching a movable portion of the air conditioner and a living body being positioned in an air conditioned space of the air conditioner, the second power is such that the second electric wave is capable of reaching the movable portion and incapable of reaching the living body, and the movable portion is a louver which is provided in the air conditioner.

* * * * *